United States Patent
Li et al.

(10) Patent No.: US 11,440,982 B2
(45) Date of Patent: Sep. 13, 2022

(54) ESTER POLYMER, PREPARATION METHOD THEREFOR AND USE THEREOF

(71) Applicants: CHINA PETROLEUM & CHEMICAL CORPORATION, Beijing (CN); RESEARCH INSTITUTE OF PETROLEUM PROCESSING, SINOPEC, Beijing (CN)

(72) Inventors: Cheng Li, Beijing (CN); Songbai Tian, Beijing (CN); Xiaowei Wang, Beijing (CN); Qundan Zhang, Beijing (CN); Hu Li, Beijing (CN); Xinyu Zhu, Beijing (CN)

(73) Assignees: CHINA PETROLEUM & CHEMICAL CORPORATION, Beijing (CN); RESEARCH INSTITUTE OF PETROLEUM PROCESSING. SINOPEC, Beijing (CN)

( * ) Notice: Subject to any disclaimer, the term of this patent is extended or adjusted under 35 U.S.C. 154(b) by 407 days.

(21) Appl. No.: 16/614,723

(22) PCT Filed: May 16, 2018

(86) PCT No.: PCT/CN2018/087068
§ 371 (c)(1),
(2) Date: Nov. 18, 2019

(87) PCT Pub. No.: WO2018/210262
PCT Pub. Date: Nov. 22, 2018

(65) Prior Publication Data
US 2020/0181300 A1     Jun. 11, 2020

(30) Foreign Application Priority Data
May 17, 2017   (CN) .......................... 201710346651.X

(51) Int. Cl.
C08F 110/10     (2006.01)
C08L 95/00      (2006.01)

(52) U.S. Cl.
CPC ............. C08F 110/10 (2013.01); C08L 95/00 (2013.01); *C08F 2810/40* (2013.01)

(58) Field of Classification Search
None
See application file for complete search history.

(56) References Cited

U.S. PATENT DOCUMENTS

| | | | |
|---|---|---|---|
| 4,414,035 A | 11/1983 | Newberry et al. | |
| 4,525,288 A * | 6/1985 | Schlicht .................. | C10L 10/08 508/555 |
| 6,946,524 B2 | 9/2005 | Breuer et al. | |

FOREIGN PATENT DOCUMENTS

| | | |
|---|---|---|
| CA | 2029465 C | 2/2002 |
| CA | 2075749 C | 11/2004 |
| CN | 105601787 A | 5/2016 |
| EP | 0263706 A2 | 4/1988 |
| WO | 2004065430 A1 | 8/2004 |
| WO | 2005033151 A1 | 4/2005 |
| WO | 2009068570 A1 | 6/2009 |
| WO | 2013189568 A1 | 12/2013 |

OTHER PUBLICATIONS

Chang et al.; Asphaltene Stabilization in Alkyl Solvents Using Oil-Soluble Amphiphiles; SPE International Symposium on Oilfield Chemistry, New Orleans, LA, U.S.A., Mar. 2-5, 1993, Society of Petroleum Engineers.

Marcano et al.; Evaluation of the Chemical Additive Effect on Asphaltene Aggregation in Dead Oils: A Comparative Study between Ultraviolet-Visible and Near-Infiared-Laser Light Scattering Techniques; Energy Fuels 2015, 29, 2813-2822, ACS Publications; DOI: 10.1021/ef502071t.

Li et al.; Dispersion and Stabilization Effectiveness of Chemical Additives on Asphaltene; Acta Petrolei Sinica (Petroleum Processing Section); Oct. 2016, vol. 32 No. 5, pp. 1005-1012.

Cheng; Study on Green Synthesis and Application of Polyisobutylene Succinic Acid Alkylol Amine Emulsifier; M.D. Dissertation; Nanjing University of Science & Technology; Mar. 2014.

* cited by examiner

*Primary Examiner* — Christopher M Rodd
(74) *Attorney, Agent, or Firm* — Novick, Kim & Lee, PLLC; Allen Xue

(57) ABSTRACT

An ester polymer has a structure represented by the following formula (I):

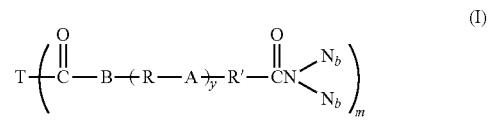

T represents the backbone of the ester polymer; the group B is each independently selected from O or S; the group R each independently represents $C_{1-10}$ hydrocarbylene group; the group A is each independently selected from O, S or NR''; the group R' each independently represents $C_{1-10}$ hydrocarbylene group; the group $N_b$ is each independently selected from H or —R'''—B'H, wherein at least one of the two $N_b$ on the same nitrogen atom is —R'''—B'H; the group R'' is each independently selected from H or $C_{1-10}$ hydrocarbyl group; the group R''' each independently represents $C_{1-10}$ hydrocarbylene group; the group B' is each independently selected from O or S; each y independently represents an integer between 1 and 6; and m is an integer between 1 and 10.

20 Claims, 9 Drawing Sheets

ESTER POLYMER, PREPARATION METHOD THEREFOR AND USE THEREOF

TECHNICAL FIELD

The present application relates to a polymer, and more particularly, to an ester polymer suitable for use as a dispersant and/or a polymerization inhibitor.

BACKGROUND ART

Asphaltenes, generally defined as petroleum components that are insoluble in n-heptane but soluble in toluene, are a class of materials defined by their solubility, which are components of heavy oils that are hardest to be processed and have the highest relative molecular weight and the highest polarity. The presence of asphaltenes provides heavy oils the characteristics of colloidal systems, and where the environment in which the asphaltenes are present changes due to a change in temperature, pressure or composition, flocculation and sedimentation of asphaltenes may easily occur, which adversely affects the production, storage, transportation and processing of petroleum. In the process of oil exploitation, the flocculation and sedimentation of asphaltenes may cause a reduction of permeability and a reversal of wettability to rocks, a permanent damage to oil deposit, and a blockage of peripheral equipment such as well pipes, separators and the like, so that the production efficiency may be seriously lowered. During the transportation and storage of petroleum, the flocculation and sedimentation of asphaltenes may cause the scaling of pumping pipelines and related processing equipment, so that the transmission efficiency may be seriously affected. During the processing of petroleum, asphaltenes may be deposited on the surfaces of hot solid bodies (such as the walls of a reactor, a furnace tube of a heating furnace and the walls of a heat exchanger) as a coke precursor, which may cause the coking and inactivation of catalysts or the coking and scaling of equipment, thereby reducing the production efficiency and bringing difficulty to the processing and utilization of heavy oils.

A most cost effective way to prevent the flocculation and sedimentation of asphaltenes is to add a chemical additive (a dispersant and/or an inhibitor). Commonly used chemical additives include alkyl phenols, alkyl sulfonic acids, alkyl pyrrolidones, alkyl phenol polyoxyethylene ethers, fatty acid ester polyols, alkyl phenolic resins, oil soluble polymers, and novel ionic liquids, among others. The conclusions in literatures regarding the dispersion and polymerization inhibiting effect of chemical additives are different, which may be associated with the type and structure of asphaltenes, the solvent conditions and the evaluation method of chemical additives. Although various chemical additives have been used in oil fields for many years, a lot of research work is still in progress with the aim of finding a chemical additive that is more effective, more economical (less expensive, obtainable from easily gained raw materials), safer to humans, and more environmentally friendly.

Asphaltene dispersants known in the art are, for example, combinations of alkylphenol-formaldehyde resins with hydrophilic-lipophilic vinyl polymers as disclosed in patents CA 2029465C and CA 2075749C. Dodecylbenzenesulfonic acid (DBSA) is described in U.S. Pat. No. 4,414,035A and published papers D. L. Chang, H. S. Fogler (SPE paper No. 25185, 1993) and Francia Marcano (Energy & Fuels, 2015, 29 (5): 2813-2822), among others, as having asphaltene-dispersing properties.

There remains a need in the art for new materials having excellent dispersing and polymerization inhibiting properties that are suitable for use as dispersants and/or polymerization inhibitors, particularly for use as asphaltene dispersants and/or polymerization inhibitors.

SUMMARY OF THE INVENTION

The above-mentioned needs in the art can be met by the present application, which provides a novel ester polymer suitable for use as a dispersant and/or polymerization inhibitor, particularly as an asphaltene dispersant and/or polymerization inhibitor, a method for its preparation and use thereof.

In one aspect, the present application provides an ester polymer having a structure represented by the following formula (I):

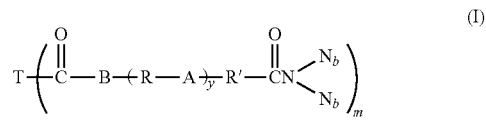

wherein the group T represents the backbone of the ester polymer;

the group B, same as or different from each other, is each independently selected from O or S;

the group R, same as or different from each other, each independently represents $C_{1-10}$ hydrocarbylene group, each group R being optionally substituted by a group selected from alkoxy, hydroxy, amino and mercapto;

the group A, same as or different from each other, is each independently selected from O, S or NR";

the group R', same as or different from each other, each independently represents $C_{1-10}$ hydrocarbylene group, each group R' being optionally substituted by a group selected from alkoxy, hydroxy, amino and mercapto;

the group $N_b$, same as or different from each other, is each independently selected from H or —R'''—B'H, wherein at least one of the two $N_b$ on the same nitrogen atom is —R'''—B'H;

the group R'', same as or different from each other, is each independently selected from H or $C_{1-10}$ hydrocarbyl;

the group R''', same as or different from each other, each independently represents $C_{1-10}$ hydrocarbylene group, each group R''' being optionally substituted by a group selected from alkoxy, hydroxy, amino and mercapto;

the group B', same as or different from each other, is each independently selected from O or S;

each y, same as or different from each other, independently represents an integer between 1 and 6; and m is an integer between 1 and 10.

In a preferred embodiment, the backbone of the ester polymer according to the present application represented by the group T is selected from the group consisting of polyolefins, polyethers and polyesters.

In another aspect, the present application provides a method for producing an ester polymer, comprising the step of subjecting a matrix polymer to an esterification reaction with at least one compound represented by the following formula (II):

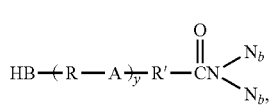

(II)

wherein the matrix polymer refers to a polymer comprising a —COOH group and/or a

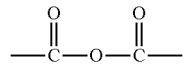

group, the group B is selected from O or S;

the group R, same as or different from each other, each independently represents $C_{1-10}$ hydrocarbylene group, each group R being optionally substituted by a group selected from alkoxy, hydroxy, amino and mercapto;

the group A, same as or different from each other, is each independently selected from O, S or NR";

the group R' represents $C_{1-10}$ hydrocarbylene group, the group R' being optionally substituted by a group selected from alkoxy, hydroxy, amino and mercapto;

the group $N_b$, same as or different from each other, is each independently selected from H or —R'''—B'H, with at least one of them being —R'''—B'H;

the group R", same as or different from each other, is each independently selected from H or $C_{1-10}$ hydrocarbyl;

the group R''', same as or different from each other, each independently represents $C_{1-10}$ hydrocarbylene group, each group R''' being optionally substituted by a group selected from alkoxy, hydroxy, amino and mercapto;

the group B', same as or different from each other, is each independently selected from O or S; and y represents an integer between 1 and 6.

In a preferred embodiment, the production method of the present application further comprises a step of reacting at least one compound represented by the following formula (III),

(III)

wherein the group $N_b$, same as or different from each other, is each independently selected from H or —R'''—B'H, with at least one of them being —R'''—B'H; and the group R''', same as or different from each other, each independently represents $C_{1-10}$ hydrocarbylene group, each group R''' being optionally substituted by a group selected from alkoxy, hydroxy, amino and mercapto;

the group B', same as or different from each other, is each independently selected from O or S;

with at least one compound of formula (IVA) and/or at least one compound of formula (IVB) to produce at least one compound of formula (II),

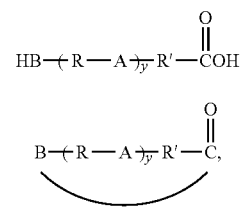

wherein the group B, same as or different from each other, is each independently selected from O or S;

the group R, same as or different from each other, each independently represents $C_{1-10}$ hydrocarbylene group, each group R being optionally substituted by a group selected from alkoxy, hydroxy, amino and mercapto;

the group A, same as or different from each other, is each independently selected from O, S or NR";

the group R', same as or different from each other, each independently represents $C_{1-10}$ hydrocarbylene group, each group R' being optionally substituted by a group selected from alkoxy, hydroxy, amino and mercapto;

the group R", same as or different from each other, is each independently selected from H or $C_{1-10}$ hydrocarbyl; and each y, same as or different from each other, independently represents an integer between 1 and 6.

In a further aspect, the present application provides the use of the ester polymer according to the present application and/or the ester polymer prepared by the method according to the present application as a dispersant and/or a polymerization inhibitor, particularly as an asphaltene dispersant and/or polymerization inhibitor.

When used as a dispersant and/or a polymerization inhibitor, particularly an asphaltene dispersant and/or polymerization inhibitor, the ester polymer according to the present application exhibits excellent dispersion and polymerization inhibition properties, for example more effective capability of reducing or solving the flocculation deposition phenomenon of asphaltenes caused by a change of external conditions, as compared with existing materials.

DETAILED DESCRIPTION OF THE INVENTION

Figure 1:
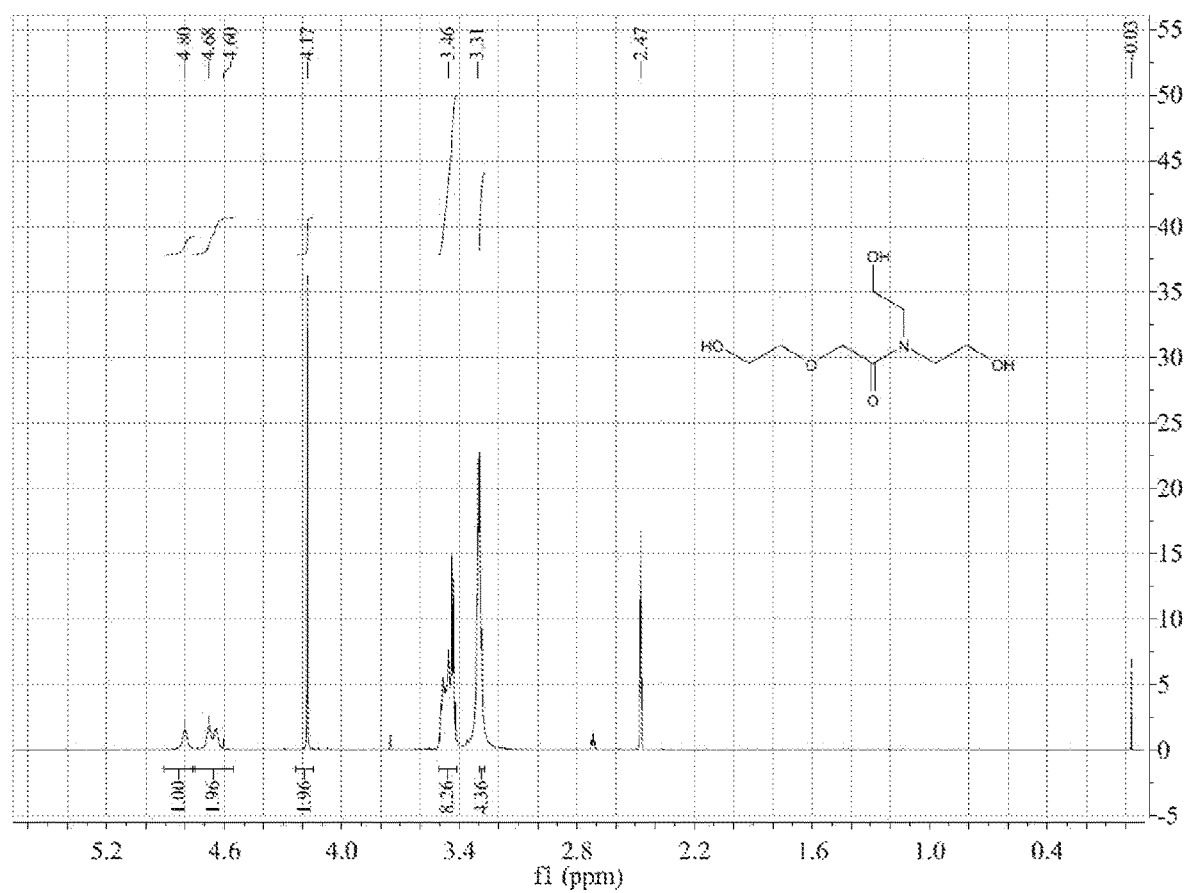
FIG. 1 is a $^1$H NMR spectrum of the intermediate compound 3 obtained in Example 1.

The embodiments of the present application will be described in detail below. It is to be understood that the embodiments described herein are merely illustrative and not restrictive.

Any numerical value (including the end values of numerical ranges) provided herein is not limited to the precise value recited, but should be interpreted as covering any value close to said precise value. Moreover, for any numerical range provided herein, one or more new numerical ranges can be obtained by arbitrarily combining the end values of the range, an end value with a specific value provided within the range, or various specific values provided within the range. Such new numerical ranges should also be considered as being specifically disclosed herein.

All patent and non-patent literatures mentioned herein, including but not limited to textbooks and journal articles, are hereby incorporated by reference in their entirety.

In this context, unless otherwise indicated, the molecular weights of all polymers are number average molecular weights Mn.

In a first aspect, the present application provides an ester polymer having a structure represented by the following formula (I):

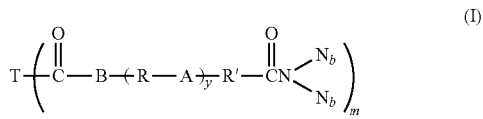

wherein the group T represents the backbone of the ester polymer; the group B, same as or different from each other, is each independently selected from O or S, preferably O;

the group R, same as or different from each other, each independently represents $C_{1-10}$ hydrocarbylene group, preferably $C_{1-6}$ linear or branched alkylene group, more preferably $C_{1-4}$ linear or branched alkylene group, each group R being optionally substituted by a group selected from alkoxy, hydroxy, amino and mercapto, preferably being unsubstituted;

the group A, same as or different from each other, is each independently selected from O, S or NR", preferably O or S, more preferably O;

the group R', same as or different from each other, each independently represents $C_{1-10}$ hydrocarbylene group, preferably $C_{1-6}$ linear or branched alkylene group, more preferably $C_{1-4}$ linear or branched alkylene group, each group R' being optionally substituted by a group selected from alkoxy, hydroxy, amino and mercapto, preferably being unsubstituted;

the group $N_b$, same as or different from each other, is each independently selected from H or —R'''—B'H, wherein at least one of the two $N_b$ on the same nitrogen atom is —R'''—B'H, preferably the two $N_b$ are each independently —R'''—B'H;

the group R", same as or different from each other, is independently selected from H or $C_{1-10}$ hydrocarbyl group, preferably selected from H or $C_{1-6}$ linear or branched alkyl group, more preferably selected from H or $C_{1-4}$ linear or branched alkyl group, most preferably H;

the group R''', same as or different from each other, each independently represents $C_{1-10}$ hydrocarbylene group, preferably $C_{1-6}$ linear or branched alkylene group, more preferably $C_{1-4}$ linear or branched alkylene group, each group R''' being optionally substituted by a group selected from alkoxy, hydroxy, amino and mercapto, preferably being unsubstituted;

the group B', same as or different from each other, is each independently selected from O or S, preferably O;

each y, same as or different from each other, independently represents an integer between 1 and 6, preferably between 1 and 3, most preferably 1; and m is an integer between 1 and 10, preferably between 1 and 5, most preferably 2.

In a preferred embodiment of the ester polymer according to the present application, the group B represents O; the group R, same as or different from each other, each independently represents $C_{1-6}$ linear or branched alkylene group; the group A, same as or different from each other, is each independently selected from O or S; the group R', same as or different from each other, each independently represents $C_{1-6}$ linear or branched alkylene group; the group $N_b$, same as or different from each other, each independently represents —R'''—B'H; the group R''', same as or different from each other, each independently represents $C_{1-6}$ linear or branched alkylene group; the group B' represents O; each y, same as or different from each other, independently represents an integer between 1 and 3; and m is an integer between 1 and 5.

In a further preferred embodiment of the ester polymer according to the present application, the group B represents O; the group R, same as or different from each other, each independently represents $C_{1-4}$ linear or branched alkylene group; the group A represents O; the group R', same as or different from each other, each independently represents $C_{1-4}$ linear or branched alkylene group; the group $N_b$, same as or different from each other, each independently represents —R'''—B'H; the group R''', same as or different from each other, each independently represents $C_{1-4}$ linear or branched alkylene group; the group B' represents O; y is 1; and m is 2.

In a preferred embodiment, the backbone of the ester polymer according to the present application represented by the group T is selected from the group consisting of polyolefins, polyethers and polyesters, preferably polyolefins, including but not limited to homopolymers or copolymers of $C_{2-20}$ olefins, more preferably homopolymers or copolymers of $C_{2-10}$ olefins, such as polyethylene, polypropylene, polybutene, polyisobutylene, polypentene, polyhexene, polyoctene, polynonene and polydecene.

In a preferred embodiment, the ester polymer according to the present application has a number average molecular weight of about 600 to about 10500, more preferably about 800 to about 4500.

In a second aspect, the present application provides a method for producing an ester polymer, comprising the step of subjecting a matrix polymer to an esterification reaction with at least one compound represented by the following formula (II):

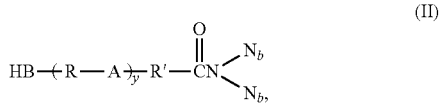

wherein the matrix polymer refers to a polymer comprising a —COOH group and/or a

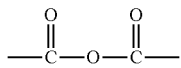

group, the group B is selected from O or S, preferably O;

the group R, same as or different from each other, each independently represents $C_{1-10}$ hydrocarbylene group, preferably $C_{1-6}$ linear or branched alkylene group, more preferably $C_{1-4}$ linear or branched alkylene group, each group R being optionally substituted by a group selected from alkoxy, hydroxy, amino and mercapto, preferably being unsubstituted;

the group A, same as or different from each other, is each independently selected from O, S or NR'', preferably O or S, more preferably O;

the group R' represents $C_{1-10}$ hydrocarbylene group, preferably $C_{1-6}$ linear or branched alkylene group, more preferably $C_{1-4}$ linear or branched alkylene group, the group R' being optionally substituted by a group selected from alkoxy, hydroxy, amino and mercapto, preferably being unsubstituted; the group $N_b$, same as or different from each other, is each independently selected from H or —R'''—B'H, with at least one of them being —R'''—B'H, preferably each independently —R'''—B'H;

the group R'', same as or different from each other, is independently selected from H or $C_{1-10}$ hydrocarbyl group, preferably selected from H or $C_{1-6}$ linear or branched alkyl group, more preferably selected from H or $C_{1-4}$ linear or branched alkyl group, most preferably H;

the group R''', same as or different from each other, each independently represents $C_{1-10}$ hydrocarbylene group, preferably $C_{1-6}$ linear or branched alkylene group, more preferably $C_{1-4}$ linear or branched alkylene group, each group R''' being optionally substituted by a group selected from alkoxy, hydroxy, amino and mercapto, preferably being unsubstituted; the group B', same as or different from each other, is each independently selected from O or S, preferably O; and y represents an integer between 1 and 6, preferably between 1 and 3, most preferably 1.

In a preferred embodiment, the production method of the present application further comprises a step of subjecting at least one compound represented by the following formula (III),

wherein the group $N_b$, same as or different from each other, is each independently selected from H or —R'''—B'H, with at least one of them being —R'''—B'H, preferably each independently —R'''—B'H; the group R''', same as or different from each other, each independently represents $C_{1-10}$ hydrocarbylene group, preferably $C_{1-6}$ linear or branched alkylene group, more preferably $C_{1-4}$ linear or branched alkylene group, each group R''' being optionally substituted by a group selected from alkoxy, hydroxy, amino and mercapto, preferably being unsubstituted; and the group B', same as or different from each other, is each independently selected from O or S, preferably O;

to an acylation reaction with at least one compound of formula (IVA) and/or at least one compound of formula (IVB) to produce at least one compound of formula (II),

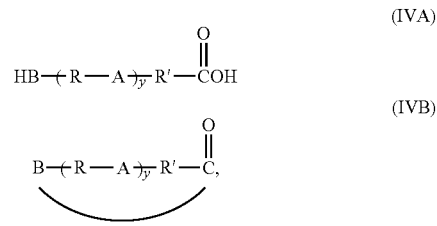

wherein the group B, same as or different from each other, is each independently selected from O or S, preferably O;

the group R, same as or different from each other, each independently represents $C_{1-10}$ hydrocarbylene group, preferably $C_{1-6}$ linear or branched alkylene group, more preferably $C_{1-4}$ linear or branched alkylene group, each group R being optionally substituted by a group selected from alkoxy, hydroxy, amino and mercapto, preferably being unsubstituted;

the group A, same as or different from each other, is each independently selected from O, S or NR'', preferably O or S, more preferably O;

the group R', same as or different from each other, each independently represents $C_{1-10}$ hydrocarbylene group, preferably $C_{1-6}$ linear or branched alkylene group, more preferably $C_{1-4}$ linear or branched alkylene group, each group R' being optionally substituted by a group selected from alkoxy, hydroxy, amino and mercapto, preferably being unsubstituted;

the group R'', same as or different from each other, is independently selected from H or $C_{1-10}$ hydrocarbyl group, preferably selected from H or $C_{1-6}$ linear or branched alkyl group, more preferably selected from H or $C_{1-4}$ linear or branched alkyl group, most preferably H; and each y, same as or different from each other, independently represents an integer between 1 and 6, preferably between 1 and 3, most preferably 1.

In a preferred embodiment of The method according to the present application, the group B represents O; the group R, same as or different from each other, each independently represents $C_{1-6}$ linear or branched alkylene group; the group A, same as or different from each other, is each independently selected from O or S; the group R', same as or different from each other, each independently represents $C_{1-6}$ linear or branched alkylene group; the group $N_b$, same as or different from each other, each independently represents —R'''—B'H; the group R''', same as or different from each other, each independently represents $C_{1-6}$ linear or branched alkylene group; the group B' represents O; and each y, same as or different from each other, independently represents an integer between 1 and 3.

In a further preferred embodiment of The method according to the present application, the group B represents O; the group R, same as or different from each other, each independently represents $C_{1-4}$ linear or branched alkylene group; the group A represents O; the group R', same as or different from each other, each independently represents $C_{1-4}$ linear or branched alkylene group; the group $N_b$, same as or different from each other, each independently represents —R'''—B'H; the group R''', same as or different from each other, each independently represents $C_{1-4}$ linear or branched alkylene group; the group B' represents O; and y is 1.

In a preferred embodiment, the compound of formula (III) is selected from the group consisting of alcohol amines, thiol amines, or mixtures thereof, preferably alcohol amines comprising two hydroxyl groups, thiol amines comprising two mercapto groups, or mixtures thereof, more preferably C1-C10 alcohol amines comprising two hydroxyl groups, C1-C10 thiol amines comprising two mercapto groups, or mixtures thereof, for example, one or more selected form the group consisting of ethanolamine, propanolamine, butanolamine, pentanolamine, hexanolamine, ethanediolamine, propanediol amine, butanediolamine, pentanediolamine, hexanediolamine, ethanethiol amine, propanethiol amine, butanethiol amine, pentanethiol amine, hexanethiol amine, ethanedithiol amine, propanedithiol amine, butanedithiol amine, pentanedithiol amine, and hexanedithiol amine.

In a preferred embodiment, the compound of formula (IVA) is one or more selected from the group consisting of ether species comprising hydroxyl and carboxyl groups, ether species comprising mercapto and carboxyl groups, and ether species comprising amino and carboxyl groups, preferably one or more selected from the group consisting of etherification products of alkylene glycols with hydroxy acids, etherification products of alkylene dithiols with hydroxy acids, and etherification products of alcohol amines with hydroxy acids, more preferably one or more selected from the group consisting of etherification products of C1-C5 alkylene glycols with C1-C5 hydroxy acids, etherification products of C1-C5 alkylene dithiols with C1-C5 hydroxy acids, and etherification products of C1-C5 alcohol amines with C1-C5 hydroxy acids, for example, one or more selected from the group consisting of 2-(2-hydroxyethoxy)-acetic acid, 3-(2-hydroxyethoxy)-propionic acid, 3-(2-hydroxyethoxy)-butyric acid, 2-(3-hydroxypropoxy)-acetic acid, 2-(4-hydroxybutoxy)-propionic acid, 2-(2-hydroxyethylthio)-acetic acid, 3-(2-hydroxyethylthio)-propionic acid, 3-(2-hydroxyethylthio)-butyric acid, 2-(3-hydroxypropylthio)-acetic acid and 2-(4-hydroxybutylthio)-propionic acid.

In a preferred embodiment, the compound of formula (IVB) is one or more selected from the group consisting of oxalactones, thiolactones and azalactones, preferably oxalactones; for example, one or more selected from the group consisting of oxapropiolactone, oxabutyrolactone (dioxane dione), oxavalerolactone, oxacaprolactone, oxaheptalactone, oxaoctanolide, thiapropiolactone, thiabutyrolactone, thiavalerolactone, thiacaprolactone, thiaheptalactone, thiaoctanolide, azapropiolactone, azabutyrolactone, azavalerolactone, azacaprolactone, azaheptalactone and azaoctanolide.

In a further preferred embodiment, the compound of formula (III) is selected from a compound of the following formula (V):

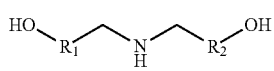

(V)

wherein $R_1$ and $R_2$, same as or different from each other, is each independently selected from C1-C10 alkylene group, preferably C1-C6 alkylene group, more preferably C1-C4 alkylene group, and $R_1$ and $R_2$ being optionally substituted by a group selected from alkoxy, hydroxy, amino and mercapto, preferably being unsubstituted.

In a further preferred embodiment, the compound of formula (IVB) is selected from a compound of the following formula (VI):

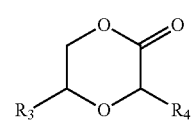

(VI)

wherein $R_3$ and $R_4$, same as or different from each other, is each independently selected from H or C1-C8 alkyl group, preferably H or C1-C4 alkyl group, the alkyl group being optionally substituted by a group selected from alkoxy, hydroxy, amino and mercapto, preferably being unsubstituted. In a preferred embodiment, the molar ratio between the compound of formula (III) and the total amount of the compounds of formula (IVA) and formula (IVB) in said acylation reaction of the compound of formula (III) with the compound of formula (IVA) and/or the compound of formula (IVB) is about 1:0.1-10, preferably about 1:0.5-5, more preferably about 1:0.9-1.1. Further preferably, the reaction temperature of the acylation reaction is about 50° C. to about 150° C., more preferably about 80° C. to about 120° C.; the reaction pressure is about 0.1 MPa to about 10 MPa, more preferably about 0.1 MPa to about 5 MPa; the reaction time is about 0.1 h to about 10 h, more preferably about 4 h to about 8 h. Particularly preferably, the reaction temperature of the acylation reaction is about 80° C. to about 120° C.; the reaction pressure is about 0.1 MPa to about 5 MPa; and the reaction time is about 4 h to about 8 h.

In a preferred embodiment, an inert gas, preferably nitrogen, may be introduced during the acylation reaction.

A solvent may be optionally added during the acylation reaction. Where a solvent is added, it may be one or more selected from the group consisting of butane, cyclobutane, pentane, cyclopentane, hexane, cyclohexane, heptane, n-heptane, octane, cyclooctane, nonane, undecane, dodecane, benzene, toluene, xylene, cumene, vegetable oil, carbon tetrachloride, dichloroethane and liquid paraffin, preferably toluene and/or xylene. The amount of the solvent is not particularly limited, and is preferably about 10% to about 200% by mass relative to the compound of the formula (III). After the reaction is completed, the solvent may be removed in any appropriate manner known to those skilled in the art.

A catalyst may be optionally added during the acylation reaction. Where a catalyst is added, it may be one or more selected from the group consisting of silica, carclazyte, magnesium silicate, alumina, silica gel and molecular sieve, and preferably silica. The amount of the catalyst is preferably about 0.1% to to about 20%, preferably about 0.5% to about 2%, by mass relative to the compound of formula (III).

In a preferred embodiment, the polymer comprising a —COOH group and/or a

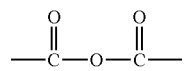

groups is a polymer comprising q —COOH groups and/or

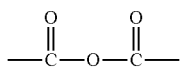

groups in the molecule, where q represents the ratio of the total number of the —COOH groups and/or the

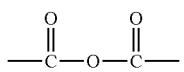

groups in the polymer to the number of molecules of the polymer, and may be a non-integer as being an average value. The q is preferably in a range of $1 \leq q \leq 10$, more preferably in a range of $1 \leq q \leq 5$. Further preferably, the polymer is a polyolefin, polyether or polyester. Particularly preferably, the number average molecular weight of the polymer comprising a —COOH group and/or a

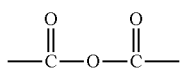

group is about 500 to about 10,000, more preferably about 600 to about 6,000, and further preferably about 600 to about 3,000.

In a preferred embodiment, the molar ratio of the polymer, calculated on the basis of the —COOH group and/or the

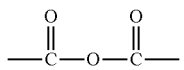

group, to the compound of formula (II) in the esterification reaction of the polymer comprising a —COOH group and/or a

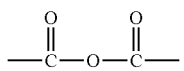

group with the compound of formula (II) is about 1:0.1-10, preferably about 1:0.5-5, more preferably about 1:0.9-1.1. More preferably, the reaction temperature of the esterification reaction is about 100° C. to about 300° C., and more preferably about 120° C. to about 200° C.; the reaction pressure is about 0.1 MPa to about 10 MPa, more preferably about 0.1 MPa to about 5 MPa; the reaction time is about 0.1 h to about 10 h, more preferably about 2 h to about 8 h. Particularly preferably, the reaction temperature of the esterification reaction is about 120° C. to about 200° C.; the reaction pressure is about 0.1 MPa to about 5 MPa; and the reaction time is about 2 h to about 8 h.

In a preferred embodiment, an inert gas, preferably nitrogen, may be introduced during the esterification reaction.

A solvent may be optionally added during the esterification reaction. Where a solvent is added, it may be one or more selected from the group consisting of butane, cyclobutane, pentane, cyclopentane, hexane, cyclohexane, heptane, n-heptane, octane, cyclooctane, nonane, undecane, dodecane, benzene, toluene, xylene, cumene, vegetable oil, carbon tetrachloride, dichloroethane and liquid paraffin. The amount of the solvent is not particularly limited, and is preferably about 10% to about 200% by mass relative to the polymer comprising a —COOH group and/or a

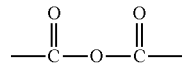

group. After the reaction is completed, the solvent may be removed in any appropriate manner known to those skilled in the art.

A catalyst may be optionally added during the esterification reaction. Where a catalyst is added, it may be one or more selected from the group consisting of silica, carclazyte, magnesium silicate, alumina, silica gel and molecular sieve, and preferably silica. The amount of the catalyst is preferably about 0.1% to about 20%, more preferably about 0.5% to about 2%, by mass relative to the polymer comprising a —COOH group and/or a

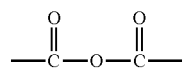

group.

In a preferred embodiment, the polymer comprising a —COOH group and/or a

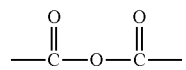

group is the product of an addition reaction of a polymer comprising a —C=C— bond with an alkenyl acid and/or alkenyl anhydride, more preferably the product of an addition reaction of a polymer comprising u —C=C— bonds in the molecule with an alkenyl acid and/or alkenyl anhydride, wherein u represents the ratio of the total number of the —C=C— groups in the polymer to the number of molecules of the polymer, which may be a non-integer as being an average value. The u is preferably in a range of $1 \leq u \leq 10$, more preferably in a range of $1 \leq u \leq 5$. Further preferably, the polymer is the product of an addition reaction of a polyolefin, polyether and/or polyester comprising u —C=C— bonds in the molecule with an alkenyl acid and/or alkenyl anhydride.

In a further preferred embodiment, the polymer comprising a —C=C— bond is a polymer comprising 1 to 2 —C=C— bonds in the molecule, more preferably a polyolefin comprising 1 to 2 —C=C— bonds in the molecule, and even more preferably a poly-α-olefin comprising one —C=CH$_2$ bond in the molecule obtained after olefin polymerization. In particular, the polyolefin comprising 1 to 2 —C=C— bonds is preferably a homopolymer or copolymer of a $C_{2-20}$ olefin, more preferably a polymer of a $C_{2-20}$ α-olefin.

Particularly preferably, the number average molecular weight of the polymer comprising a —C=C— bond is about 500 to about 10,000, more preferably about 600 to about 6,000, and even more preferably about 600 to about 3,000.

In a further preferred embodiment, the alkenyl acid and/or alkenyl anhydride is a $C_{3-10}$ alkenyl acid and/or alkenyl anhydride, more preferably a $C_{4-10}$ alkenyl diacid and/or alkenyl dianhydride, for example, one or more selected from the group consisting of acrylic acid, crotonic acid, pentenoic acid, hexenoic acid, heptenoic acid, octenoic acid, nonenoic acid, decenoic acid, butenedioic acid, pentenedioic acid, hexenedioic acid, heptenedioic acid, octenedioic acid, nonenedioic acid, decenedioic acid, maleic anhydride, butenedioic anhydride, pentenedioic anhydride, hexenedioic anhydride, heptenedioic anhydride, octenedioic anhydride, nonenedioic anhydride, and decenedioic anhydride.

In a further preferred embodiment, the molar ratio between the polymer comprising a —C═C— bond (calculated on the basis of the —C═C— bond) and the alkenyl acid and/or alkenyl anhydride is about 1:0.1-10, preferably about 1:0.5-5, more preferably about 1:0.9-1.1; the reaction temperature of the reaction between the polymer comprising a —C═C— bond and the alkenyl acid and/or alkenyl anhydride is about 100° C. to about 350° C., more preferably about 200° C. to about 300° C.; the reaction pressure is about 0.1 MPa to about 10 MPa, more preferably about 0.1 MPa to about 5 MPa; the reaction time is about 0.1 h to about 10 h, more preferably about 0.5 h to about 10 h. Further preferably, the molar ratio between the polymer comprising a —C═C— bond (calculated on the basis of the —C═C— bond) and the alkenyl acid and/or alkenyl anhydride is about 1:0.9-1.1; the reaction temperature is about 200° C. to about 300° C.; the reaction pressure is about 0.1 MPa to about 5 MPa; the reaction time is about 0.5 h to about 10 h. Particularly preferably, an inert gas, preferably nitrogen, is introduced during the reaction.

Solvents may be optionally added during the reaction between the polymer comprising a —C═C— bond and the alkenyl acid and/or alkenyl anhydride. Where a solvent is added, it may be one or more selected from the group consisting of water, DMF, NMP, acetone, DMSO, butane, cyclobutane, pentane, cyclopentane, hexane, cyclohexane, heptane, n-heptane, octane, cyclooctane, nonane, undecane, dodecane, benzene, toluene, xylene, cumene, vegetable oil, carbon tetrachloride and dichloroethane, preferably toluene and/or xylene. The amount of the solvent is not particularly limited, and is preferably about 10% to about 200% by mass relative to the polymer comprising a —C═C— bond. After the reaction is completed, the solvent may be removed in any appropriate manner known to those skilled in the art.

A catalyst may be optionally added during the reaction between the polymer comprising a —C═C— bond and the alkenyl acid and/or alkenyl anhydride. Where a catalyst is added, it may be one or more selected from the group consisting of silica, carclazyte, magnesium silicate, alumina, silica gel and molecular sieve, and preferably silica. The amount of the catalyst is preferably about 0.1% to to about 20%, more preferably about 0.5% to about 2%, by mass relative to the polyolefin comprising a —C═C— bond.

According to the present application, after the production method of the ester polymer is completed, the catalyst and the solvent, if any, may be removed from the reaction mixture finally obtained by any appropriate manner commonly known, thereby providing the ester polymer.

The ester polymer of the present application is suitable for use as a dispersant and/or polymerization inhibitor, particularly as an asphaltene dispersant and/or polymerization inhibitor.

In a third aspect, the present application also provides the use of the ester polymer according to the present application and/or the ester polymer obtained by the method according to the present application as a dispersant and/or polymerization inhibitor, in particular as an asphaltene dispersant and/or polymerization inhibitor.

When the ester polymer according to the present application is used as a dispersant and/or polymerization inhibitor, particularly as an asphaltene dispersant and/or polymerization inhibitor, it shows excellent dispersing and polymerization inhibiting properties.

In a particularly preferred embodiment, the present application provides the following technical solutions:

Item 1. An ester polymer having a structure represented by the following formula (I):

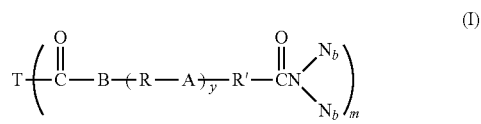

wherein
the group T represents the backbone of the ester polymer;
the group B, same as or different from each other, is each independently selected from O or S, preferably O;
the group R, same as or different from each another, each independently represents $C_{1-10}$ hydrocarbylene group, preferably $C_{1-6}$ linear or branched alkylene group, more preferably $C_{1-4}$ linear or branched alkylene group;
the group A, same as or different from each other, is each independently selected from O, S or NH, preferably O or S, more preferably O;
the group R', same as or different from each other, each independently represents $C_{1-10}$ hydrocarbylene group, preferably $C_{1-6}$ linear or branched alkylene group, more preferably $C_{1-4}$ linear or branched alkylene group;
the group $N_b$, same as or different from each other, is each independently selected from H or —R'''—B'H, wherein at least one of the two $N_b$ within the same repeating unit, i.e. on the same nitrogen atom, is —R'''—B'H, more preferably the two $N_b$ are each independently —R'''—B'H;
the group R''', same as or different from each another, each independently represents $C_{1-10}$ hydrocarbylene group, preferably $C_{1-6}$ linear or branched alkylene group, more preferably $C_{1-4}$ linear or branched alkylene group;
the group B', same as or different from each other, is each independently selected from O or S, preferably O;
each y, same as or different from each other, independently represents an integer between 1 and 6, preferably between 1 and 3, most preferably 1; and
m is an integer between 1 and 10, preferably between 1 and 5, most preferably 2.

Item 2. The ester polymer according to Item 1, wherein the backbone represented by the group T is one or more selected from the group consisting of polyolefins, polyethers and polyesters, preferably polyolefins.

Item 3. The ester polymer according to Item 2, wherein the polyolefin is a homopolymer or copolymer of a $C_{2-20}$ olefin.

Item 4. The ester polymer according to any one of Items 1 to 3, wherein,
the group T represents a polyolefin chain;
the group B represents O;
the group R, same as or different from each other, each independently represents $C_{1-6}$ linear or branched alkylene group;
the group A, same as or different from each other, is each independently selected from O or S;

the group R', same as or different from each other, each independently represents $C_{1-6}$ linear or branched alkylene group;

the group $N_b$, same as or different from each other, each independently represents —R'''—B'H;

the group R''', same as or different from each other, each independently represents $C_{1-6}$ linear or branched alkylene group;

the group B' represents O;

each y, same as or different from each other, independently represents an integer between 1 and 3; and m is an integer between 1 and 5.

Item 5. The ester polymer according to Item 4, wherein, the group T represents a polyolefin chain;

the group B represents O;

the group R, same as or different from each other, each independently represents $C_{1-4}$ linear or branched alkylene group;

the group A represents O;

the group R', same as or different from each other, each independently represents $C_{1-4}$ linear or branched alkylene group;

the group $N_b$, same as or different from each other, each independently represents —R'''—B'H;

the group R''', same as or different from each other, each independently represents $C_{1-4}$ linear or branched alkylene group;

the group B' represents O;

y is 1; and m is 2.

Item 6. The ester polymer according to any one of Items 1 to 5, wherein the ester polymer has a number average molecular weight of about 600 to about 10500, preferably about 800 to about 4500.

Item 7. A method for producing an ester polymer, comprising the step of subjecting a matrix polymer to an esterification reaction with a compound represented by the following formula (II):

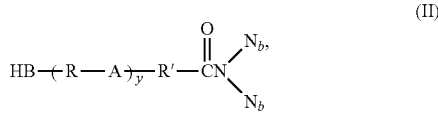

(II)

wherein the matrix polymer is a polymer comprising a —COOH group and/or a

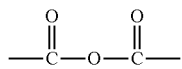

group;

the group B is selected from O or S, preferably O;

the group R, same as or different from each another, each independently represents $C_{1-10}$ hydrocarbylene group, preferably $C_{1-6}$ linear or branched alkylene group, more preferably $C_{1-4}$ linear or branched alkylene group;

the group A, same as or different from each other, is each independently selected from O, S or NH, preferably O or S, more preferably O;

the group R' represents $C_{1-10}$ hydrocarbylene group, preferably $C_{1-6}$ linear or branched alkylene group, more preferably $C_{1-4}$ linear or branched alkylene group; the group $N_b$, same as or different from each other, is each independently selected from H or —R'''—B'H, with at least one of them being —R'''—B'H, more preferably each independently being —R'''—B'H;

the group R''', same as or different from each another, each independently represents $C_{1-10}$ hydrocarbylene group, preferably $C_{1-6}$ linear or branched alkylene group, more preferably $C_{1-4}$ linear or branched alkylene group;

the group B', same as or different from each other, is each independently selected from O or S, preferably O; and y represents an integer between 1 and 6, preferably between 1 and 3, most preferably 1.

Item 8. The method according to Item 7, further comprising a step of subjecting a compound represented by the following formula (III),

(III)

wherein the group $N_b$, same as or different from each other, is each independently selected from H or —R'''—B'H, with at least one of them being —R'''—B'H, more preferably each independently being —R'''—B'H;

the group R''', same as or different from each another, each independently represents $C_{1-10}$ hydrocarbylene group, preferably $C_{1-6}$ linear or branched alkylene group, more preferably $C_{1-4}$ linear or branched alkylene group;

the group B', same as or different from each other, is each independently selected from O or S, preferably O;

to an acylation reaction with a compound represented by the following formula (IVA) and/or a compound represented by the following formula (IVB) to produce a compound represented by the formula (II),

(IVA)

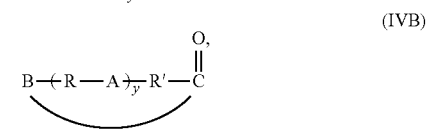

(IVB)

wherein the group B, same as or different from each other, is each independently selected from O or S, preferably O;

the group R, same as or different from each another, each independently represents $C_{1-10}$ hydrocarbylene group, preferably $C_{1-6}$ linear or branched alkylene group, more preferably $C_{1-4}$ linear or branched alkylene group;

the group A, same as or different from each other, is each independently selected from O, S or NH, preferably O or S, more preferably O;

the group R', same as or different from each other, each independently represents $C_{1-10}$ hydrocarbylene group, preferably $C_{1-6}$ linear or branched alkylene group, more preferably $C_{1-4}$ linear or branched alkylene group; and each y, same as or different from each other, independently represents an integer between 1 and 6, preferably between 1 and 3, most preferably 1.

Item 9. The method according to Item 7 or 8, wherein the group B represents O; the group R, same as or different from each other, each independently represents $C_{1-6}$ linear or branched alkylene group; the group A, same as or different from each other, is each independently selected from O or S; the group R', same as or different from each other, each independently represents $C_{1-6}$ linear or branched alkylene group; the group $N_b$, same as or different from each other, each independently represents —R'''—B'H; the group R''', same as or different from each other, each independently represents $C_{1-6}$ linear or branched alkylene group; the group B' represents O; and each y, same as or different from each other, independently represents an integer between 1 and 3.

Item 10. The method according to Item 9, wherein the group B represents O; the group R, same as or different from each other, each independently represents $C_{1-4}$ linear or branched alkylene group; the group A represents O; the group R', same as or different from each other, each independently represents $C_{1-4}$ linear or branched alkylene group; the group $N_b$, same as or different from each other, each independently represents —R'''—B'H; the group R''', same as or different from each other, each independently represents $C_{1-4}$ linear or branched alkylene group; the group B' represents O; and y is 1.

Item 11. The method according to any one of Items 8 to 10, wherein the compound of formula (III) is an alcohol amine and/or a thiol amine, preferably an alcohol amine comprising two hydroxyl groups and/or a thiol amine comprising two mercapto groups, more preferably a C1-C10 alcohol amine comprising two hydroxyl groups and/or a C1-C10 thiol amine comprising two mercapto groups.

Item 12. The method according to any one of Items 8-11, wherein the compound of formula (IVA) is one or more selected from the group consisting of ether species comprising hydroxyl and carboxyl groups, ether species comprising mercapto and carboxyl groups, and ether species comprising amino and carboxyl groups, preferably one or more selected from the group consisting of etherification products of alkylene glycols with hydroxy acids, etherification products of alkylene dithiols with hydroxy acids, and etherification products of alcohol amines with hydroxy acids, more preferably one or more selected from the group consisting of etherification products of C1-C5 alkylene glycols with C1-C5 hydroxy acids, etherification products of C1-C5 alkylene dithiols with C1-C5 hydroxy acids, and etherification products of C1-C5 alcohol amines with C1-C5 hydroxy acids.

Item 13. The method according to any one of Items 8-12, wherein the compound of formula (IVB) is one or more selected from the group consisting of oxalactones, thiolactones and azalactones, preferably oxalactones.

Item 14. The method according to any one of Items 8-13, wherein the compound of formula (III) is one or more selected from the group consisting of ethanolamine, propanolamine, butanolamine, pentanolamine, hexanolamine, ethanediolamine, propanediolamine, butanediolamine, pentanediolamine, hexanediolamine, ethanethiolamine, propanethiolamine, butanthiolamine, pentanthiolamine, hexanethiolamine, ethanedithiolamine, propanedithiolamine, butanedithiolamine, pentanedithiolamine, and hexanedithiolamine; the compound of formula (IVA) is one or more selected from the group consisting of 2-(2-hydroxyethoxy)-acetic acid, 3-(2-hydroxyethoxy)-propionic acid, 3-(2-hydroxyethoxy)-butyric acid, 2-(3-hydroxypropoxy)-acetic acid, 2-(4-hydroxybutoxy)-propionic acid, 2-(2-hydroxyethylthio)-acetic acid, 3-(2-hydroxyethylthio)-propionic acid, 3-(2-hydroxyethylthio)-butyric acid, 2-(3-hydroxypropylthio)-acetic acid and 2-(4-hydroxybutylthio)-propionic acid; and the compound of formula (IVB) is one or more selected from the group consisting of oxapropiolactone, oxabutyrolactone (dioxane dione), oxavalerolactone, oxacaprolactone, oxaheptalactone, oxaoctanolide, thiapropiolactone, thiabutyrolactone, thiavalerolactone, thiacaprolactone, thiaheptalactone, thiaoctanolide, azapropiol actone, azabutyrol actone, azavalerolactone, azacaprolactone, azaheptalactone and azaoctanolide.

Item 15. The method according to any one of Items 8-13, wherein the compound of formula (III) is selected from a compound of the following formula (V):

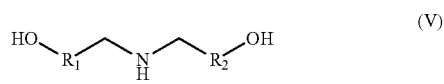

wherein $R_1$ and $R_2$, same as or different from each other, is each independently selected from C1-C10 alkylene group, preferably C1-C4 alkylene group.

Item 16. The method according to any one of Items 8-13 or 15, wherein the compound of formula (IVB) is selected from a compound of the following formula (VI):

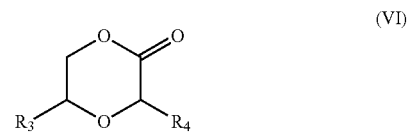

wherein $R_3$ and $R_4$, same as or different from each other, is each independently selected from H or C1-C10 alkyl group, preferably H or C1-C4 alkyl.

Item 17. The method according to any one of Items 7 to 16, wherein the polymer comprising a —COOH group and/or a

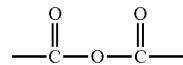

group is a polymer comprising q —COOH groups and/or

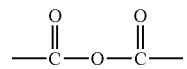

groups in the molecule, wherein q represents the ratio of the total number of —COOH groups and/or

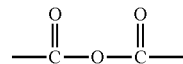

groups in the polymer to the number of molecules of the polymer, and is in a range of 1≤q≤10, preferably 1≤q≤5, particularly preferably the polymer is a polyolefin, a polyether or a polyester.

Item 18. The method according to any one of Items 7 to 17, wherein the number average molecular weight of the polymer comprising a —COOH group and/or a

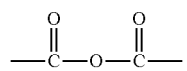

group is about 500 to about 10,000, preferably about 600 to about 6,000, and more preferably about 600 to about 3,000.

Item 19. The method according to any one of Items 8-18, wherein in the acylation reaction of the compound of formula (III) with the compound of formula (IVA) and/or the compound of formula (IVB), the molar ratio between the compound of formula (III) and the total amount of the compound of formula (IVA) and the compound of formula (IVB) is about 1:0.1-10, preferably about 1:0.5-5, more preferably about 1:0.9-1.1; the reaction temperature is about 50° C. to about 150° C., preferably about 80° C. to about 120° C.; the reaction pressure is about 0.1 MPa to about 10 MPa, preferably about 0.1 MPa to about 5 MPa; the reaction time is about 0.1 h to about 10 h, preferably about 4 h to about 8 h.

Item 20. The method according to any one of Items 7-19, wherein in the esterification reaction of the polymer comprising a —COOH group and/or a

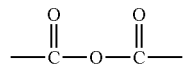

group with the compound of formula (II), the molar ratio of the polymer, calculated on the basis of the —COOH group and/or the

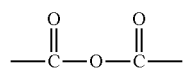

group, to the compound of formula (II) is about 1:0.1-10, preferably about 1:0.5-5, more preferably about 1:0.9-1.1; the reaction temperature is about 100° C. to about 300° C., preferably about 120° C. to about 200° C.; the reaction pressure is about 0.1 MPa to about 10 MPa, preferably about 0.1 MPa to about 5 MPa; the reaction time is about 0.1 h to about 10 h, preferably about 2 h to about 8 h.

Item 21. The method according to any one of Items 7 to 20, wherein the polymer comprising a —COOH group and/or a

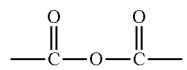

group is the product of an addition reaction of a polymer comprising a —C=C— bond with an alkenyl acid and/or an alkenyl anhydride, preferably the product of an addition reaction of a polymer comprising u —C=C— bonds in the molecule with an alkenyl acid and/or an alkenyl anhydride, and further preferably the product of an addition reaction of a polyolefin, polyether and/or polyester comprising u —C=C— bonds in the molecule with an alkenyl acid and/or an alkenyl anhydride, wherein u represents the ratio of the total number of the —C=C— group in the polymer to the number of molecules of the polymer, and is in a range of $1 \leq u \leq 10$, preferably $1 \leq u \leq 5$.

Item 22. The method according to Item 21, wherein the polymer comprising a —C=C— bond is a polymer comprising a 1 to 2 —C=C— bonds in the molecule, more preferably a polyolefin comprising a 1 to 2 —C=C— bonds in the molecule, and even more preferably a poly-α-olefin comprising one —C=CH$_2$ bond in the molecule.

Item 23. The method according to Item 21 or 22, wherein the number average molecular weight of the polymer comprising a —C=C— bond is about 500 to about 10,000, more preferably about 600 to about 6,000, and even more preferably about 600 to about 3,000.

Item 24. The method according to any one of Items 21-23, wherein the polyolefin comprising a —C=C— bond is selected from the group consisting of homopolymers or copolymers of $C_{2-20}$ olefins, preferably polymers of $C_{2-20}$ α-olefins.

Item 25. The method according to any one of Items 21-24, wherein the alkenyl acid and/or alkenyl anhydride is a $C_{3-10}$ alkenyl acid and/or alkenyl anhydride, more preferably a $C_{4-10}$ alkenyl diacid and/or alkenyl dianhydride.

Item 26. The method according to any one of Items 21-25, wherein the alkenyl acid and/or alkenyl anhydride is one or more selected from the group consisting of acrylic acid, crotonic acid, pentenoic acid, hexenoic acid, heptenoic acid, octenoic acid, nonenoic acid, decenoic acid, butenedioic acid, pentenedioic acid, hexenedioic acid, heptenedioic acid, octenedioic acid, nonenedioic acid, decenedioic acid, maleic anhydride, butenedioic anhydride, pentenedioic anhydride, hexenedioic anhydride, heptenedioic anhydride, octenedioic anhydride, nonenedioic anhydride, and decenedioic anhydride.

Item 27. Use of the ester polymer according to any one of Items 1 to 6 and/or the ester polymer obtained by the method according to any one of Items 7 to 26 as a dispersant and/or polymerization inhibitor, particularly as an asphaltene dispersant and/or polymerization inhibitor.

EXAMPLES

The present application will be further illustrated by the following working examples, which are not intended to limit the scope of the present application.

Reagents and Instruments

The reagents and instruments used in the working examples of the present application were as follows:

Diethanolamine: analytically pure (standard 98%), available from Beijing Coupling Technologies, Inc.;

Diisopropanolamine: analytically pure (standard 98%), available from Beijing Coupling Technologies, Inc.;

Triethanolamine (TEA): analytically pure (standard 98%), available from Beijing Coupling Technologies, Inc.;

1,4-dioxan-2-one: analytically pure (standard 98%), available from Beijing Coupling Technologies, Inc.;

Valerolactone: analytically pure (standard 98%), available from Beijing Coupling Technologies, Inc.;

Polyisobutylene maleic anhydride (n=15, Mn=994): a product of BASF-YPC Company Limited, Nanjing; and Polyisobutylene maleic anhydride (n=18, Mn=1162): a product of BASF-YPC Company Limited, Nanjing.

$^1$H NMR spectrum: obtained by using a Bruker AVANCE III HD series Nuclear Magnetic Resonance (NMR) spectrometer of Bruker company;

Infrared spectrum: obtained by using a Nicolet 6700 FT-IR Spectrometer manufactured by Thermo Fisher Scientific Co., USA;

Liquid chromatography mass (LCMS) spectrum: obtained by using a Shimadzu Liquid Chromatography-Mass Spectrometer LCMS-2020, Shimadzu Corporation, Japan, with an ELSD detector.

Test Methods

In the following examples, the dispersion effect of each dispersant tested was evaluated by the method for preparing samples according to ASTM D7061-2012 and the method for evaluating an asphaltene chemical additive described in "Stable dispersion effect of a chemical additive in asphaltenes" by Cheng L I et al., Petroleum Journal (Petroleum Processing), 2016, 32 (5), pages 1005-1012.

The test method is as follows: A sample solution of an oil sample in toluene with a mass ratio of 1:9 was prepared. A given amount of the sample solution was weighed, a given amount of a dispersant was added, stirring was performed for 30 minutes by using a magnetic stirrer, 2 mL of the resulted sample solution comprising the dispersant was removed and mixed with 23 mL of n-heptane, immediately transferred to a sample cell, and measured by using a Turberscan Stability Analyzer (Turberscan Lab Stability Analyzer, manufactured by Formulation Company, French). The temperature for the measurement was 30° C., the scanning time was 3 h, and the scanning interval was 1 min.

The degree of change in light intensity within 3 h is defined as ISP, in accordance with the following equation (1):

$$ISP = \sqrt{\frac{\sum_{i=1}^{i}(X_i - X_T)^2}{n-1}} \quad (1)$$

wherein $X_i$ represents the average value of the intensity of the back-scattered light (or the intensity of the transmitted light) obtained at different heights of the sample cell in each scanning; $X_T$ is the average value of $X_i$, i.e. $X_T=(X_1+X_2+\ldots+X_n)/n$; n is the number of scans that is 181.

The ISP value is an indication of the degree of instability of the system, and the larger the ISP value, the more unstable the system, the more easily the asphaltenes flocculate and settle. The degree of ISP value Change ($C_{ISP}$) was defined to visually and quantitatively evaluate the capacity of the dispersant for dispersing and stabilizing the asphaltenes, in accordance with the following equation (2):

$$C_{ISP} = \frac{ISP_i - ISP_0}{ISP_0} \times 100\% \quad (2)$$

wherein $ISP_0$ represents the ISP value of the sample obtained before addition of the dispersant, and $ISP_i$ represents the ISP value of the sample obtained after addition of the dispersant i. Therefore, the dispersant shows an effect of dispersing and stablizing asphaltenes only when $C_{ISP}<0$, and the smaller the $C_{ISP}$, the more significant the effect of the dispersant.

The literature results show that, when the sample shows an ISP<3, or a $C_{ISP}<-75\%$, the layering of the sample is not significant, indicating that the asphaltene concentration in the sample is low or that the dispersant is capable of substantially dispersing asphaltene precipitates in hydrocarbon mixtures.

Example 1 Preparation of an Inventive Ester Polymer 10.5 g of diethanolamine (Compound 1) and 10.2 g of 1,4-dioxan-2-one (Compound 2) were uniformly mixed and added into a 50 ml round-bottom flask, the mixture was heated to 100° C. for reaction for 6 hours, the Compound 1 and Compound 2 were melted during heating, and the mixture was cooled and kept stand to obtain 20 g of N,N-bis-(2-hydroxyethyl)-2-hydroxyethoxyacetamide (Intermediate Compound 3) as a colorless oil, which was directly used for the next reaction without purification.

0.5 equivalent of polyisobutylene maleic anhydride (Compound 4, n=15, Mn=994) relative to the Intermediate Compound 3 was charged to a 50 mL round-bottom flask, purged with nitrogen for 5 minutes, then heated to 160° C., and stirred at 160° C. for 30 minutes. Intermediate Compound 3 was added to the solution, the reaction was continued at 160° C. for 3.5 hours, and cooled to room temperature to give Product Polymer 5 as a yellow oil L-01.

An exemplary reaction scheme was as follows:

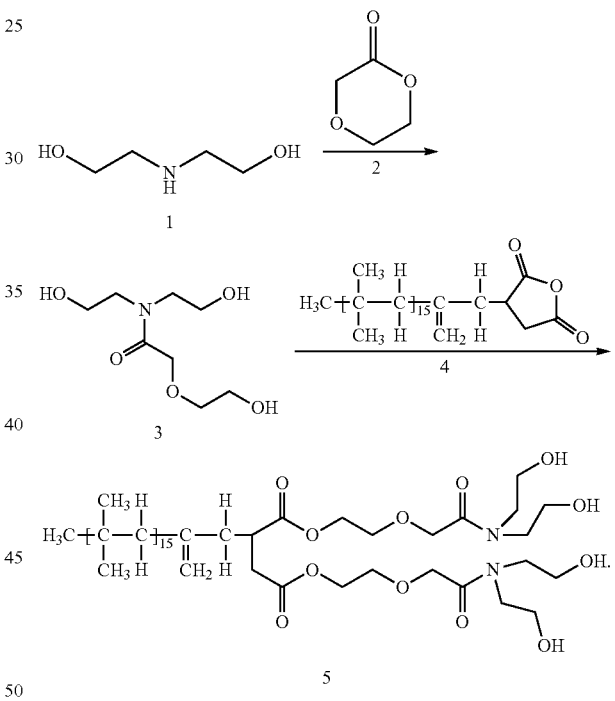

Figure 2:
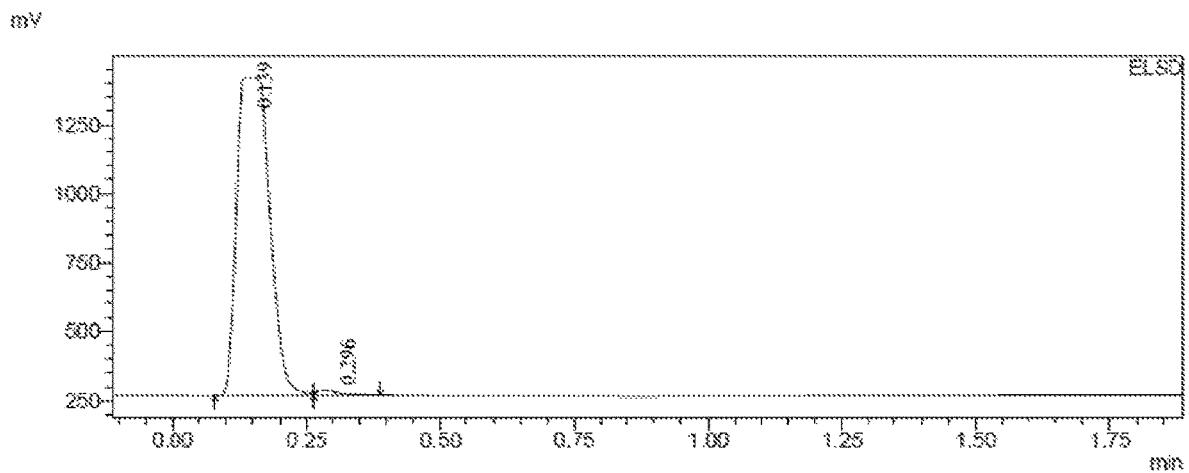
FIG. 2 is a liquid chromatography mass (LCMS) spectrum of the intermediate compound 3.
Figure 2:
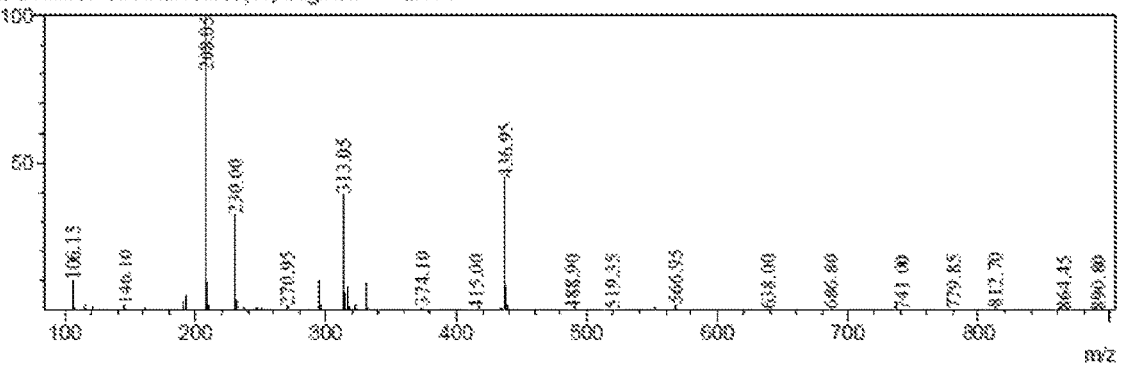
Figure 3:
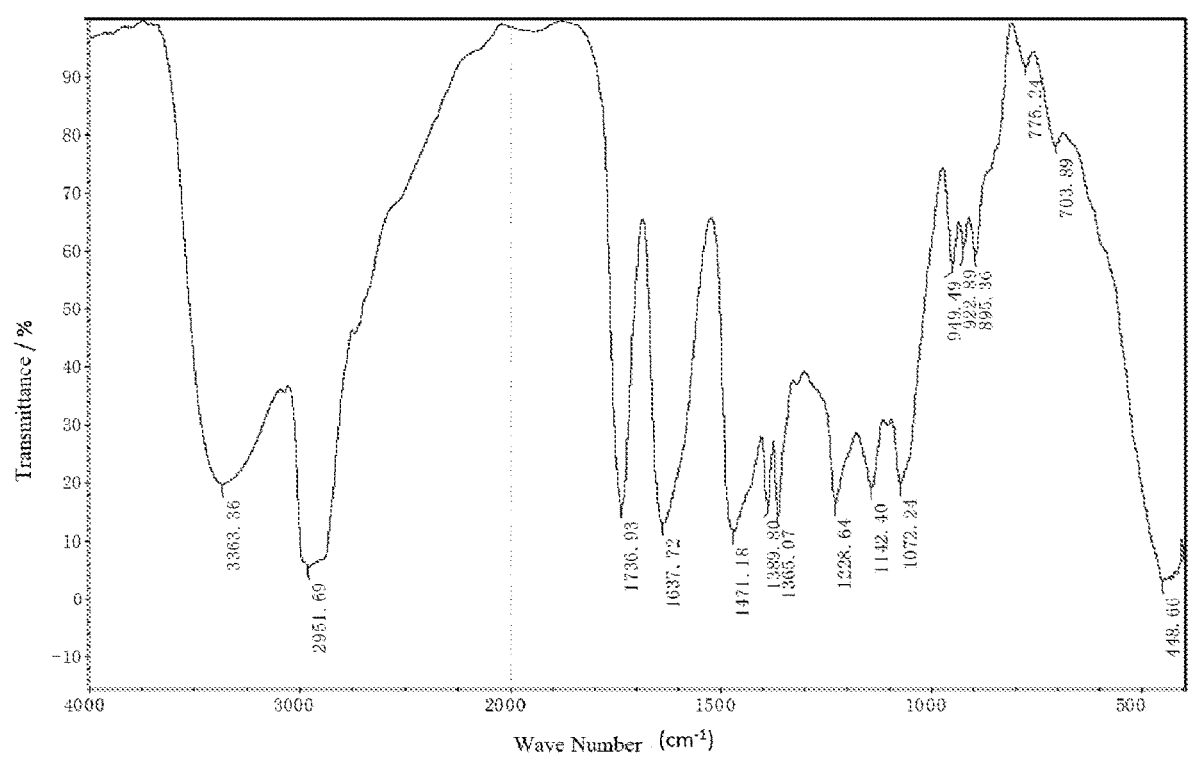
FIG. 3 is an infrared spectrum of the product polymer 5 obtained in Example 1.

The $^1$HNMR spectrum of the Intermediate Compound 3 obtained after the first-step reaction of Example 1 is shown in FIG. 1, its liquid chromatography mass (LCMS) spectrum is shown in FIG. 2 and the IR spectrum of the Product Polymer 5 is shown in FIG. 3. As can be seen from FIG. 1 and FIG. 2, the conversion rate of the reaction is high, and the yield of the Intermediate Compound 3 after the first-step reaction is nearly 99%.

Example 2 Preparation of an Inventive Ester Polymer 13.3 g of diisopropanolamine (Compound 6) and 10.2 g of 1,4-dioxan-2-one (Compound 2) were uniformly mixed and added into a 50 mL round-bottom flask, the mixture was heated to 100° C. for reaction for 6 hours, the Compound 1 and Compound 2 were melt during heating, and the mixture was cooled and kept stand to obtain 23 g of N,N-bis-(2-hydroxyisopropyl)-2-hydroxyethoxyacetamide (Intermediate Compound 7) as a colorless oil, which was directly used for the next reaction without purification.

0.5 equivalent of polyisobutylene maleic anhydride PIBSA (Compound 4, n=15, Mn=994) relative to the Intermediate Compound 7 was added to a 50 mL round-bottom flask, purged with nitrogen for 5 minutes, heated to 160° C., and then stirred at 160° C. for 30 minutes. Intermediate Compound 7 was added to the solution, the reaction was continued at 160° C. for 3.5 hours, and cooled to room temperature to give Product Polymer 8 as a yellow oil L-03.

An exemplary reaction scheme was as follows:

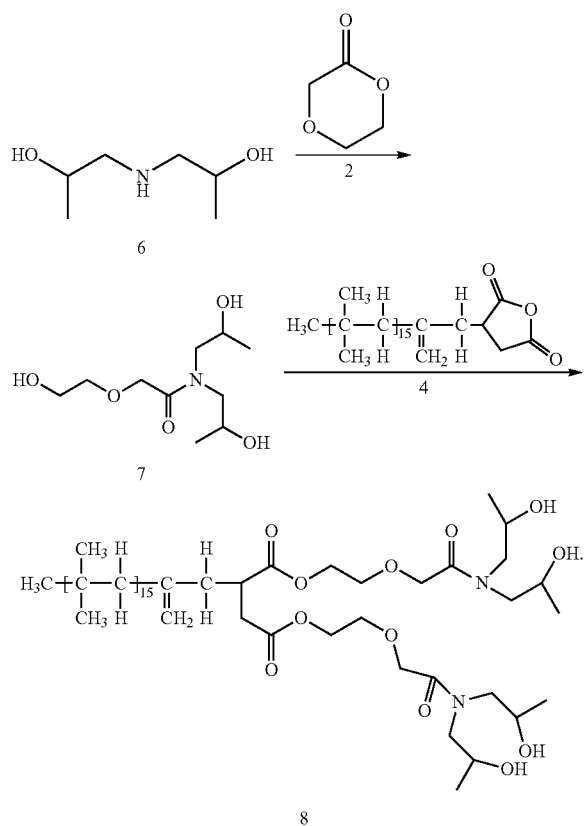

Figure 4:
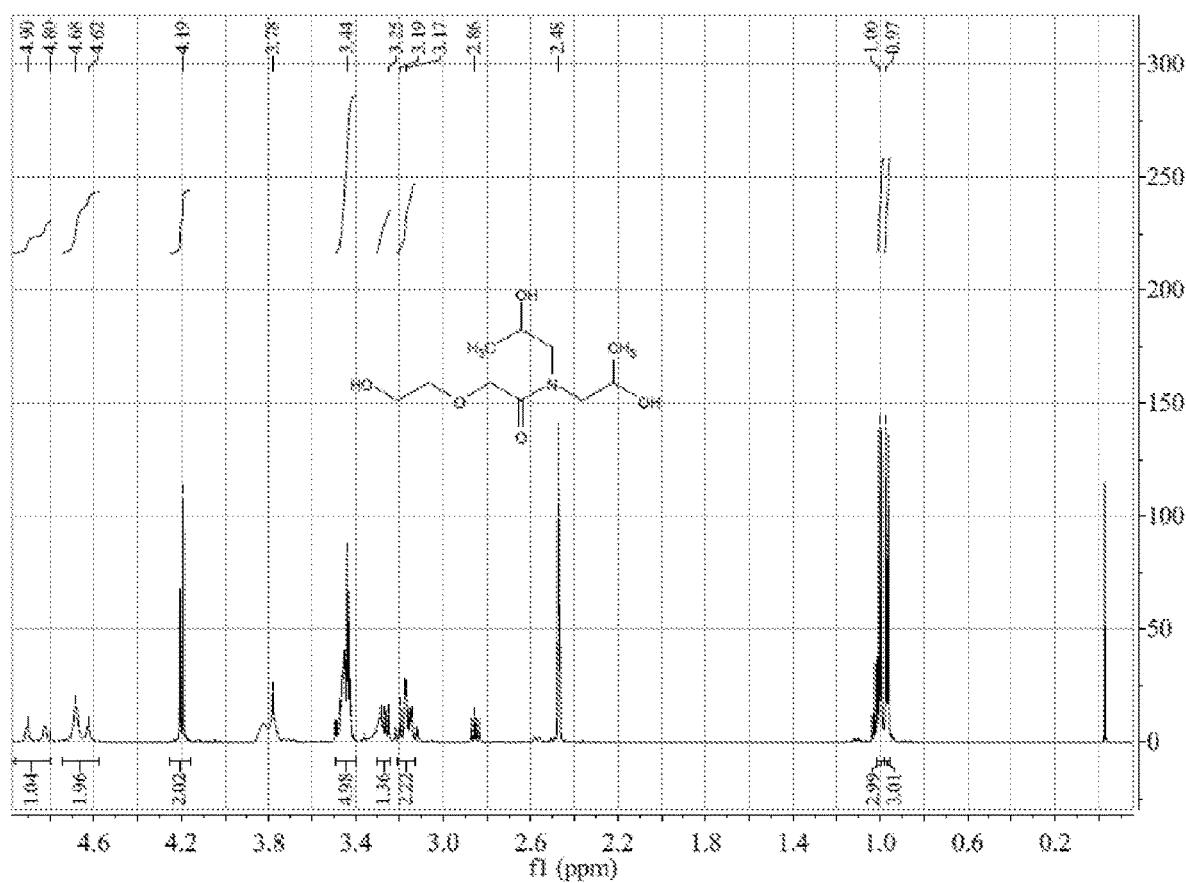
FIG. 4 is a $^1$H NMR spectrum of the intermediate compound 7 obtained in Example 2.
Figure 5:
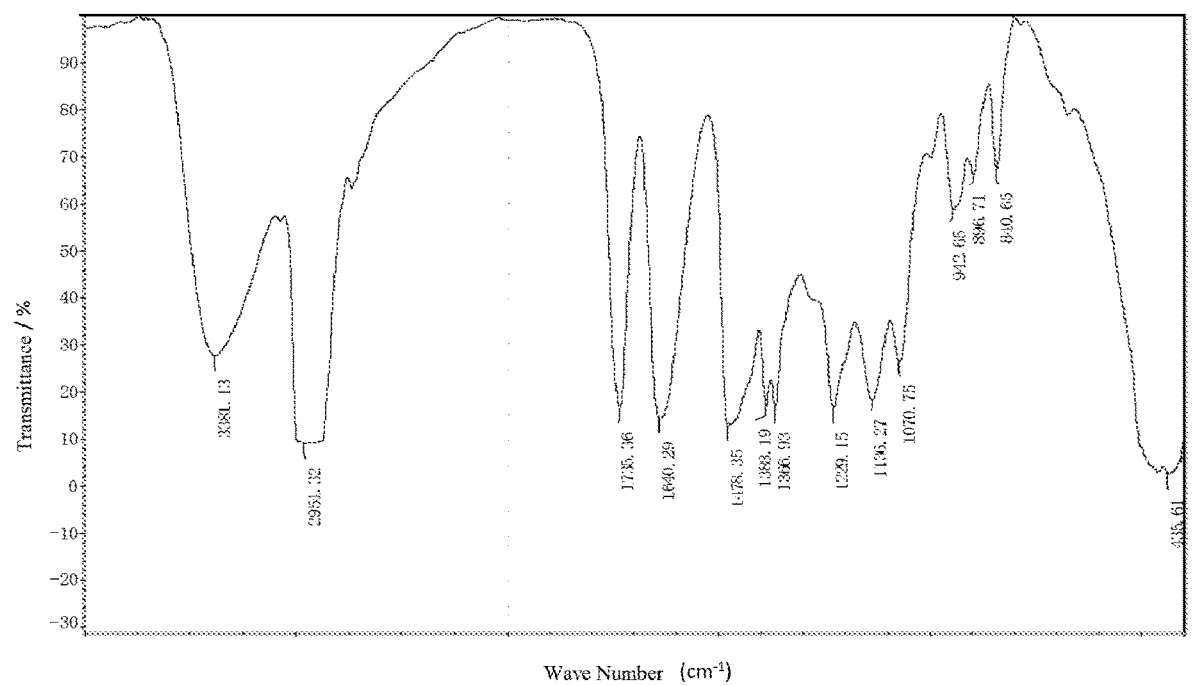
FIG. 5 is an infrared spectrum of the product polymer 8 obtained in Example 2.

$^1$HNMR spectrum of the Intermediate Compound 7 obtained in Example 2 is shown in FIG. 4, and the IR spectrum of the Product Polymer 8 is shown in FIG. 5.

Example 3 Preparation of an Inventive Ester Polymer 10.5 g of diethanolamine (Compound 1) and 10.2 g of 1,4-dioxan-2-one (Compound 2) were uniformly mixed and added into a 50 mL round-bottom flask, the mixture was heated to 100° C. for reaction for 6 hours, the Compound 1 and Compound 2 were melt during heating, and the mixture was cooled and kept stand to obtain 20 g of N,N-bis-(2-hydroxymethyl)-2-hydroxyethoxyacetamide (Intermediate Compound 3) as a colorless oil, which was directly used for the next reaction without purification.

0.5 equivalent of polyisobutylene maleic anhydride (Compound 9, n=18, Mn=1162) relative to the Intermediate Compound 3 was added to a 50 mL round-bottom flask, purged with nitrogen for 5 minutes, heated to 160° C., and then stirred at 160° C. for 30 minutes. Intermediate Compound 3 was added to the solution, the reaction was continued at 160° C. for 3.5 hours, and cooled to room temperature to give Product Polymer 10 as a yellow oil L-02.

An exemplary reaction scheme was as follows:

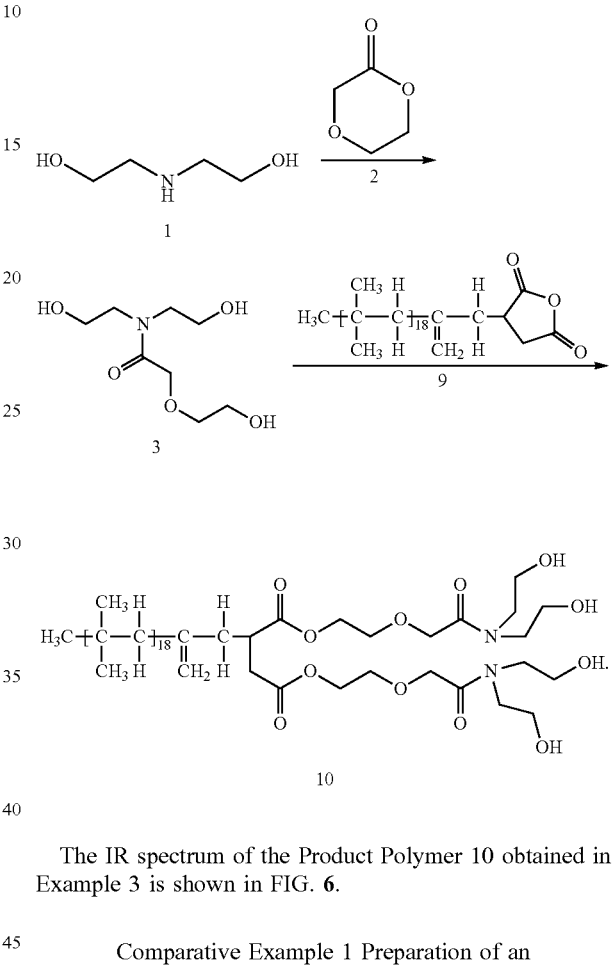

Figure 6:
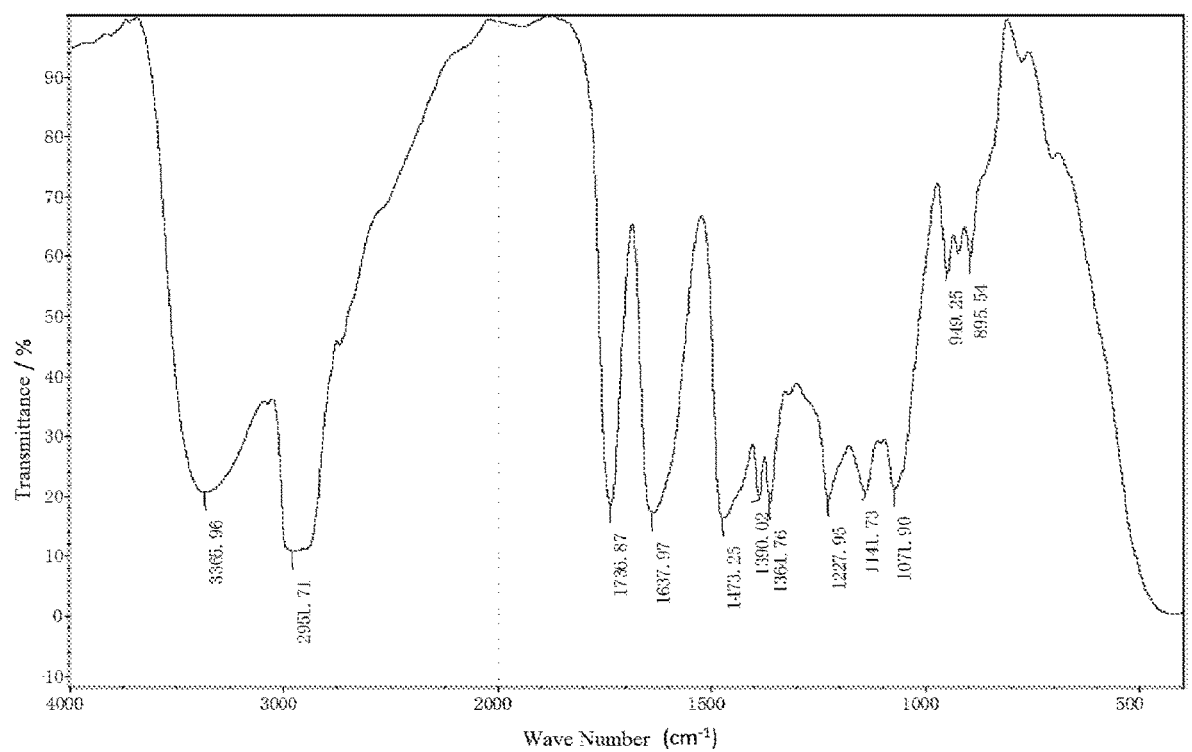
FIG. 6 is an infrared spectrum of the product polymer 10 obtained in Example 3.

The IR spectrum of the Product Polymer 10 obtained in Example 3 is shown in FIG. 6.

Comparative Example 1 Preparation of an Inventive Ester Polymer 10.5 g of diethanolamine (Compound 1) and 10.0 g of valerolactone (Compound 11) were uniformly mixed and added into a 50 mL round-bottom flask, the mixture was heated to 100° C. for reaction for 6 hours, the Compound 1 and Compound 2 were melt during heating, and the mixture was cooled and kept stand to obtain 20 g of 5-hydroxy-N,N-bis-(2-hydroxyethyl)-valeramide (Intermediate Compound 13) as a colorless oil, which was used in the next reaction without purification.

0.5 equivalent of polyisobutylene maleic anhydride (Compound 4, n=15, Mn=994) relative to Intermediate Compound 13 was charged to a 50 mL round-bottom flask, purged with nitrogen for 5 minutes, heated to 160° C., and then stirred at 160° C. for 30 minutes. Intermediate Compound 13 was added to the solution, the reaction was continued at 160° C. for 3.5 hours, and cooled to room temperature to give Product Polymer 14 as a yellow oil D-01.

An exemplary reaction scheme was as follows:

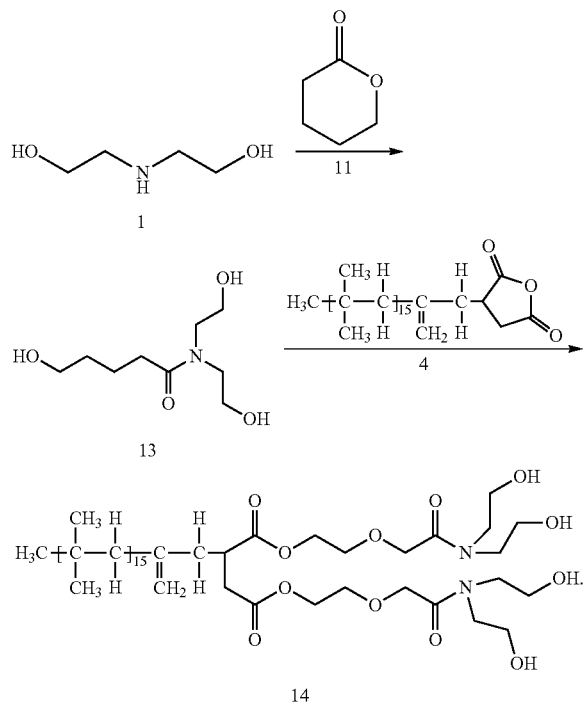

Figure 7:
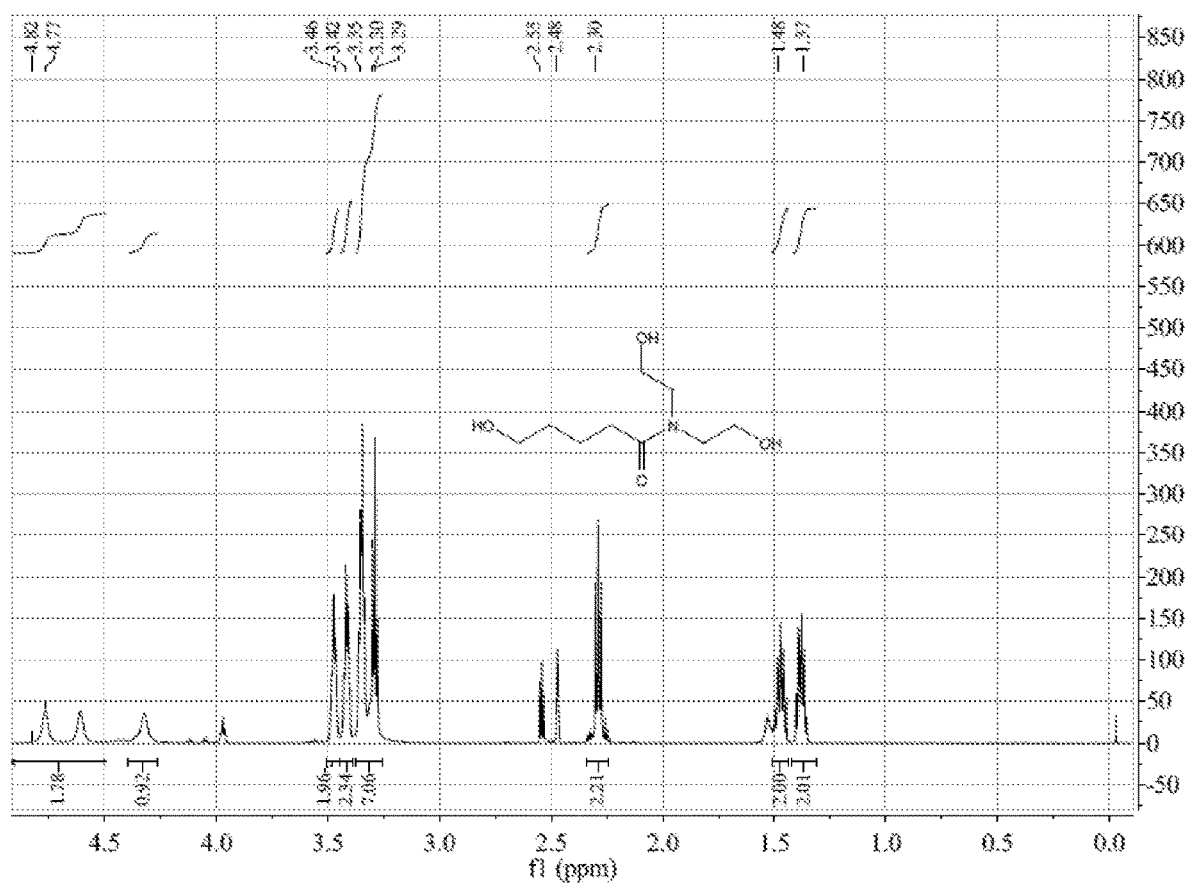
FIG. 7 is a $^1$H NMR spectrum of the intermediate compound 13 obtained in Comparative Example 1.
Figure 8:
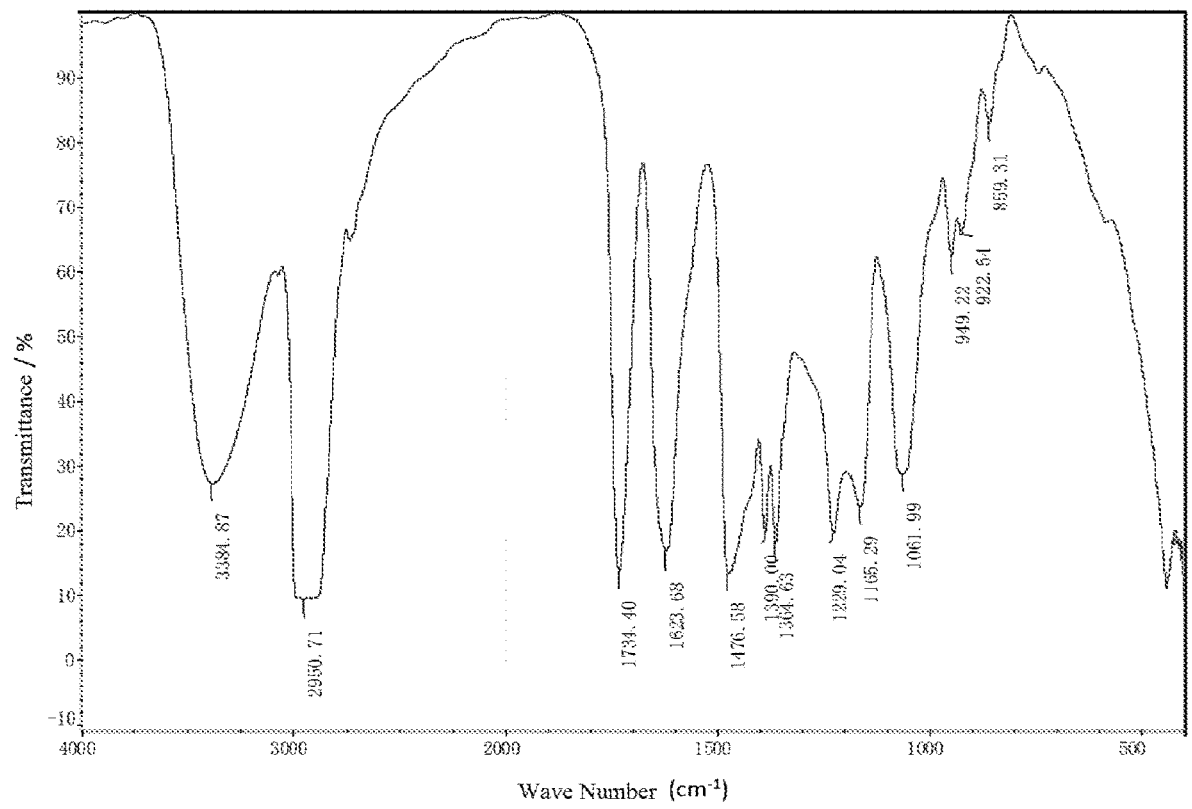
FIG. 8 is an infrared spectrum of the product polymer 14 obtained in Comparative Example 1.

¹HNMR spectrum of the Intermediate Compound 13 obtained in Comparative Example 1 is shown in FIG. 7, and the IR spectrum of the Product Polymer 14 is shown in FIG. 8.

Comparative Example 2 Preparation of a Non-Inventive Ester Polymer

Polyisobutylene maleic anhydride PIBSA (Compound 4, n=15, Mn=994) was subjected to an esterification reaction with 2 equivalents of triethanolamine (TEA), in accordance with the literature "Study on Green Synthesis and Application of Polyisobutylene Succinic Acid Alkylol Amine Emulsifier", Liusuo CHENG, Thesis for Master's Degree, Nanjing University of Science & Technology, 2014, page 28, second paragraph from the bottom, to obtain Product Polymer D-02.

The reaction conditions were as follows: n(PIBSA)/n (TEA)=1:2, nitrogen atmosphere, the PIBSA was preheated to 160° C., the TEA was slowly added while stirring with a control of the addition rate, and the temperature was kept for 3.5 hours to conduct a reaction after the dropwise addition.

Figure 9:
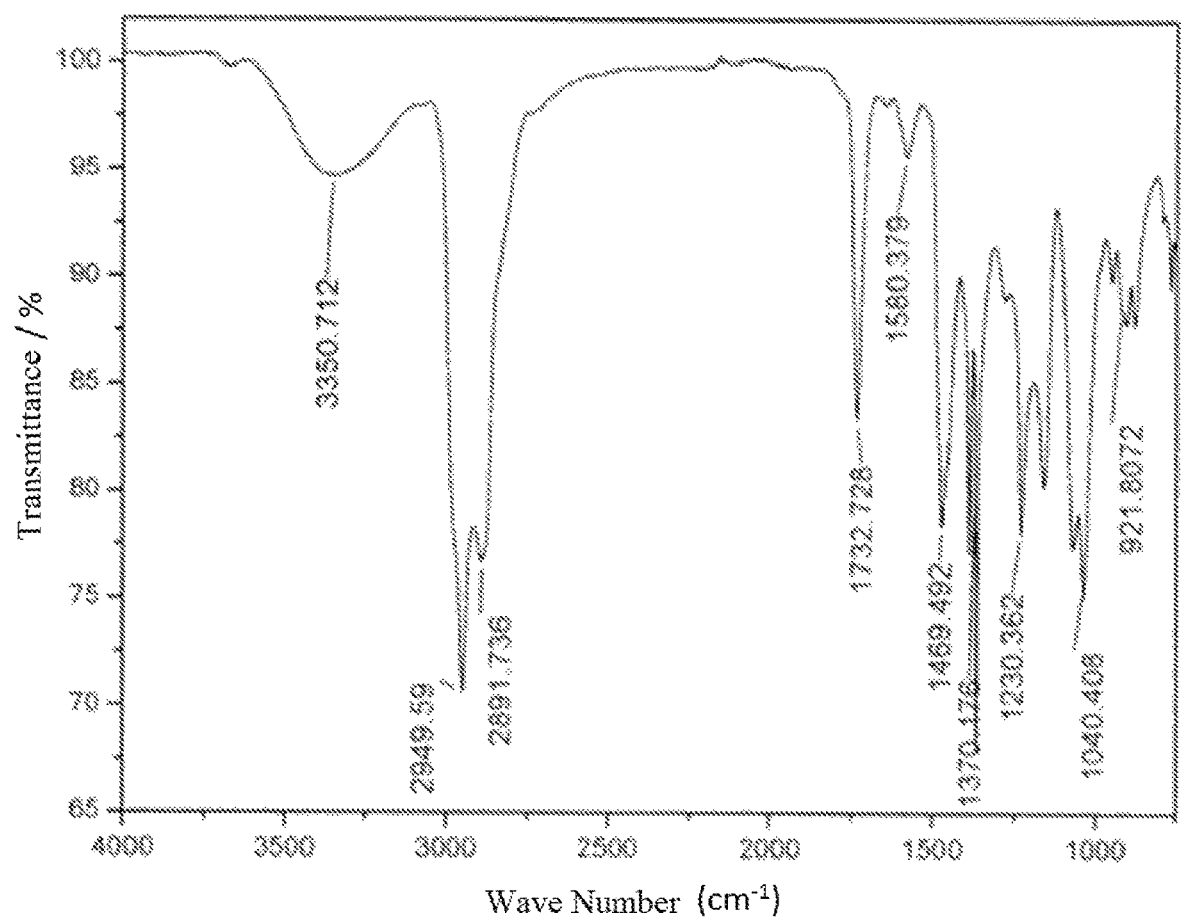
FIG. 9 is an infrared spectrum of the product polymer D-02 obtained in Comparative Example 2.

The IR spectrum of the Product Polymer D-02 obtained in Comparative Example 2 is shown in FIG. 9.

Example 4 Test of Dispersing Performance

Tahe vacuum residue (THVR) having a boiling point higher than 540° C. (provided by Sinopec Research Institute of Petroleum Processing, composition and properties shown in Table 1 below) was used as a test object, the above asphaltene dispersants L-01, L-02, L-03, D-01, D-02, commercially available dispersant F110 (available from Croda Company, UK), dodecylbenzenesulfonic acid (DBSA, purity 90%, J & K Reagent) and lubricating oil ashless dispersant polyisobutene amide T154 (produced by Jinzhou Petrochemical Co., Ltd.) were evaluated for their effect of dispersing asphaltenes in a n-heptane-toluene-vacuum residue system when added in an amount of 50 ppm, 200 ppm, 500 ppm and 1000 ppm (mass ratio of the additive to the vacuum residue).

The results of the blank test and the test results obtained after addition of the additives are shown in Table 2.

TABLE 1

Composition and properties of the Tahe vacuum residue (THVR) used in the test

| Item | THVR |
|---|---|
| Origin | China |
| Name | Tahe |
| $\rho$ (20° C.)/(g · cm$^{-3}$) | 1.07 |
| w (S), % | 3.6 |
| w (N), % | 0.59 |
| w (Ni)/(μg · g$^{-1}$) | 82.7 |
| w (V)/(μg · g$^{-1}$) | 532 |
| w (Ni + V)/(μg · g$^{-1}$) | 614.9 |
| w (saturated fraction), % | 7.1 |
| w (aromatic fraction), % | 32.2 |
| w (colloid), % | 22.4 |
| w (aromatic fraction + colloid), % | 54.6 |
| w (asphaltenes), % | 38.3 |
| Carbon residue, % | 37.5 |

TABLE 2

Evaluation results of the dispersion efficiency of each dispersant (including blank test)

| | Sample | ISP value | $C_{ISP}$ |
|---|---|---|---|
| Blank sample | THVR | 12.3 | / |
| Dispersant concentration of 50 ppm | THVR + 50 ppm DBSA | 13.70 | 11.38% |
| | THVR + 50 ppm F110 | 10.29 | −16.34% |
| | THVR + 50 ppm T154 | 12.35 | 0.40% |
| | THVR + 50 ppm D-01 | 8.34 | −32.20% |
| | THVR + 50 ppm D-02 | 10.69 | −13.09% |
| | THVR + 50 ppm L-01 | 1.85 | −84.96% |
| | THVR + 50 ppm L-02 | 2.34 | −80.98% |
| | THVR + 50 ppm L-03 | 1.19 | −90.33% |
| Dispersant concentration of 200 ppm | THVR + 200 ppm DBSA | 15.36 | 24.88% |
| | THVR + 200 ppm F110 | 8.33 | −31.72% |
| | THVR + 200 ppm T154 | 11.44 | −6.99% |
| | THVR + 200 ppm D-01 | 6.77 | −44.96% |
| | THVR + 200 ppm D-02 | 7.39 | −39.92% |
| | THVR + 200 ppm L-01 | 0.16 | −98.70% |
| | THVR + 200 ppm L-02 | 0.64 | −94.80% |
| | THVR + 200 ppm L-03 | 0.11 | −99.11% |
| Dispersant concentration of 500 ppm | THVR + 500 ppm DBSA | 17.23 | 40.08% |
| | THVR + 500 ppm F110 | 3.25 | −73.58% |
| | THVR + 500 ppm T154 | 9.67 | −21.62% |
| | THVR + 500 ppm D-01 | 2.28 | −81.46% |
| | THVR + 500 ppm D-02 | 3.16 | −74.31% |
| | THVR + 500 ppm L-01 | 0.11 | −99.11% |
| | THVR + 500 ppm L-02 | 0.13 | −98.94% |
| | THVR + 500 ppm L-03 | 0.09 | −99.27% |
| Dispersant concentration of 1000 ppm | THVR + 1000 ppm DBSA | 22.93 | 86.42% |
| | THVR + 1000 ppm F110 | 0.83 | −93.25% |
| | THVR + 1000 ppm T154 | 2.31 | −81.22% |
| | THVR + 1000 ppm D-01 | 0.78 | −93.65% |
| | THVR + 1000 ppm D-02 | 2.34 | −80.98% |
| | THVR + 1000 ppm L-01 | 0.09 | −99.27% |
| | THVR + 1000 ppm L-02 | 0.11 | −99.11% |
| | THVR + 1000 ppm L-03 | 0.07 | −99.43% |

For the samples obtained after addition of the chemical additives, no precipitate was observed in the samples when ISP<3, and $C_{ISP}$<−75%. As can be seen from the test results shown in Table 2, all of the asphaltene dispersants according to the present application show a $C_{ISP}$ value of less than −75% at the same addition amount as in the Comparative Examples, and show a $C_{ISP}$ value significantly less than that obtained in the Comparative Examples at a lower addition amount (e.g., 50 ppm), indicating that the dispersants according to the present application are capable of more effectively dispersing asphaltene precipitates in hydrocarbon mixtures.

In the context hereinabove, the inventive concept of the present application has been described with reference to specific embodiments. However, it will be understood by those skilled in the art that various modifications and changes may be made without departing from the scope of the invention as defined in the appended claims. Accordingly, the specification and figures are to be regarded in an illustrative rather than a restrictive sense, and all such modifications and changes are intended to be included within the scope of present application.

It is to be understood that certain features which are, for clarity, described herein in separate embodiments, may also be provided in combination in a single embodiment. Conversely, various features which are, for brevity, described in a single embodiment, may also be provided separately or in any subcombination.

The invention claimed is:

1. An ester polymer having a structure represented by the following formula (I):

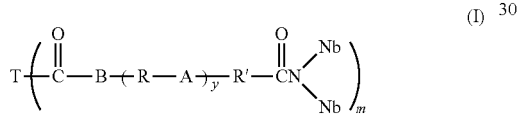

(I)

wherein
the group T represents the backbone of the ester polymer;
the group B, same as or different from each other, is each independently O or S;
the group R, same as or different from each other, each independently represents $C_{1-10}$ hydrocarbylene group, each group R being optionally substituted by a group selected from alkoxy, hydroxy, amino, and mercapto;
the group A, same as or different from each other, is each independently selected from O, S, and NR";
the group R', same as or different from each other, each independently represents $C_{1-10}$ hydrocarbylene group, each group R' being optionally substituted by a group selected from alkoxy, hydroxy, amino, and mercapto;
the group $N_b$, same as or different from each other, is each independently H or —R'''—B'H, wherein at least one of the two $N_b$ on the same nitrogen atom is —R'''—B'H;
the group R", same as or different from each other, is each independently H or $C_{1-10}$ hydrocarbyl group;
the group R''', same as or different from each other, each independently represents $C_{1-10}$ hydrocarbylene group, each group R''' being optionally substituted by a group selected from alkoxy, hydroxy, amino, and mercapto;
the group B', same as or different from each other, is each independently O or S;
each y, same as or different from each other, independently represents an integer between 1 and 6, inclusive; and
m is an integer between 1 and 10, inclusive.

2. The ester polymer according to claim 1, wherein the backbone represented by the group T is selected from polyolefins, polyethers, and polyesters.

3. The ester polymer according to claim 2, wherein the backbone represented by the group T is a polyolefin chain, and the polyolefin is a homopolymer or copolymer of a $C_{2-20}$ olefin.

4. The ester polymer according to claim 1, wherein
the group B represents O;
the group R, same as or different from each other, each independently represents $C_{1-4}$ linear or branched alkylene group;
the group A represents O;
the group R', same as or different from each other, each independently represents $C_{1-4}$ linear or branched alkylene group;
the group $N_b$, same as or different from each other, each independently represents —R'''—B'H;
the group R''', same as or different from each other, each independently represents $C_{1-4}$ linear or branched alkylene group;
the group B' represents O;
y is 1; and
m is 2.

5. The ester polymer according to claim 1, having a number average molecular weight of 600 to 10500.

6. A method for producing an ester polymer, comprising the step of subjecting a matrix polymer to an esterification reaction with at least one compound represented by the following formula (II):

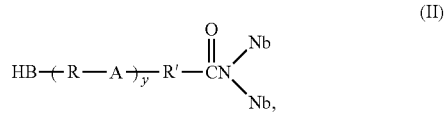

(II)

wherein
the matrix polymer is a polymer comprising a —COOH group and/or a

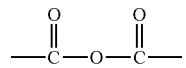

group,
the group B is O or S;
the group R, same as or different from each other, each independently represents $C_{1-10}$ hydrocarbylene group, each group R being optionally substituted by a group selected from alkoxy, hydroxy, amino, and mercapto;
the group A, same as or different from each other, is each independently selected from O, S, and NR";
the group R' represents $C_{1-10}$ hydrocarbylene group, the group R' being optionally substituted by a group selected from alkoxy, hydroxy, amino and mercapto;
the group $N_b$, same as or different from each other, is each independently H or R'''—B'H, with at least one of them being R''' B'H;
the group R", same as or different from each other, is each independently H or $C_{1-10}$ hydrocarbyl group;
the group R''', same as or different from each other, each independently represents $C_{1-10}$ hydrocarbylene group, each group R''' being optionally substituted by a group selected from alkoxy, hydroxy, amino, and mercapto;
the group B', same as or different from each other, is each independently O or S; and
y represents an integer between 1 and 6, inclusive.

7. The method according to claim 6, further comprising a step of subjecting at least one compound represented by the following formula (III)
to an acylation reaction with at least one compound of formula (IVA), at least one compound of formula (IVB), or a combination of at least one compound of formula (IVA) and at least one compound of formula (IVB) to produce at least one compound of formula (II),

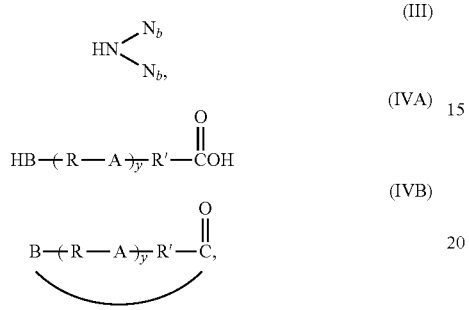

wherein, in formula (III),
the group $N_b$, same as or different from each other, is each independently H or —R'''—B'H, with at least one of them being —R'''—B'H;
the group R''', same as or different from each other, each independently represents $C_{1-10}$ hydrocarbylene group, each group R''' being optionally substituted by a group selected from alkoxy, hydroxy, amino, and mercapto; and
the group B', same as or different from each other, is each independently O or S, wherein, in formulae (IVA) and (IVB),
the group B, same as or different from each other, is each independently O or S;
the group R, same as or different from each other, each independently represents $C_{1-10}$ hydrocarbylene group, each group R being optionally substituted by a group selected from alkoxy, hydroxy, amino, and mercapto;
the group A, same as or different from each other, is each independently selected from O, S, and NR'';
the group R', same as or different from each other, each independently represents $C_{1-10}$ hydrocarbylene group, each group R' being optionally substituted by a group selected from alkoxy, hydroxy, amino, and mercapto;
the group R'', same as or different from each other, is each independently H or $C_{1-10}$ hydrocarbyl group; and
each y, same as or different from each other, independently represents an integer between 1 and 6, inclusive.

8. The method according to claim 7, wherein the at least one compound of the formula (III) is selected from alcohol amines, thiol amines, and mixtures thereof.

9. The method according to claim 7, wherein the at least one compound of formula (IVA) is one or more selected from ether species comprising hydroxyl and carboxyl groups, ether species comprising mercapto and carboxyl groups, and ether species comprising amino and carboxyl groups.

10. The method according to claim 7, wherein the at least one compound of formula (IVB) is one or more selected from oxalactones, thiolactones, and azalactones.

11. The method according to claim 7, wherein the at least one compound of formula (III) is a compound of the following formula (V):

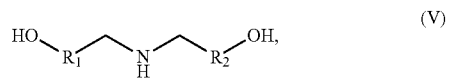

wherein $R_1$ and $R_2$, same as or different from each other, is each independently $C_{1-10}$ alkylene group, and $R_1$ and $R_2$ being optionally substituted by a group selected from alkoxy, hydroxy, amino, and mercapto.

12. The method according to claim 7, wherein the at least one compound of formula (IVB) is a compound of the following formula (VI):

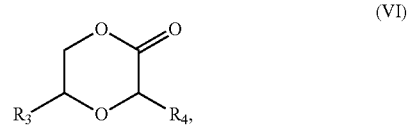

wherein $R_3$ and $R_4$, same as or different from each other, is each independently H or $C_{1-8}$ alkyl group, the alkyl group being optionally substituted by a group selected from alkoxy, hydroxy, amino, and mercapto.

13. The method according to claim 6, wherein the matrix polymer comprises q groups that are independently selected from —COOH and

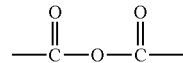

wherein q represents a ratio of a total number of —COOH and

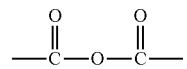

in the polymer to a number of molecules of the polymer, and is in a range of $1 \leq q \leq 10$.

14. The method according to claim 6, wherein the matrix polymer is a product of addition reaction of a polymer comprising a —C=C— bond with an alkenyl acid, an alkenyl anhydride, or a combination of an alkenyl acid and an alkenyl anhydride, wherein the polymer comprising a —C=C— bond is a polyolefin having 1 to 2 —C=C— bonds in the molecule.

15. The method according to claim 14, wherein the polyolefin having 1 to 2 —C=C— bonds is selected from homopolymers and copolymers of $C_{2-20}$ olefins.

16. The method according to claim 14, wherein the alkenyl acid is $C_{3-10}$ alkenyl acid, and the alkenyl anhydride is $C_{3-10}$ alkenyl anhydride.

17. The method according to claim 14, wherein the alkenyl acid is one or more selected from acrylic acid, crotonic acid, pentenoic acid, hexenoic acid, heptenoic acid, octenoic acid, nonenoic acid, decenoic acid, butenedioic acid, pentenedioic acid, hexenedioic acid, heptenedioic acid, octenedioic acid, nonenedioic acid, and decenedioic acid, and the alkenyl anhydride is one or more selected from maleic anhydride, butenedioic anhydride, pentenedioic anhydride, hexenedioic anhydride, heptenedioic anhydride, octenedioic anhydride, nonenedioic anhydride, and decenedioic anhydride.

18. The method according to claim 6, wherein the number average molecular weight of the matrix polymer is 500 to 10,000.

19. A composition comprising the ester polymer according to claim 1 as a dispersant or polymerization inhibitor, wherein the composition further comprises asphaltene.

20. The ester polymer according to claim 1, wherein
the group R, same as or different from each other, each independently represents $C_{1-6}$ linear or branched alkylene group;
the group A, same as or different from each other, is each independently O or S;
the group R', same as or different from each other, each independently represents $C_{1-6}$ linear or branched alkylene group;
the group R", same as or different from each other, is each independently H or $C_{1-6}$ linear or branched alkyl group;
the group R''', same as or different from each other, each independently represents $C_{1-6}$ linear or branched alkylene group;
each y, same as or different from each other, independently represents 1, 2, or 3; and
m represents 1, 2, 3, 4, or 5.

* * * * *

UNITED STATES PATENT AND TRADEMARK OFFICE
CERTIFICATE OF CORRECTION

PATENT NO. : 11,440,982 B2
APPLICATION NO. : 16/614723
DATED : September 13, 2022
INVENTOR(S) : Cheng Li et al.

Page 1 of 1

It is certified that error appears in the above-identified patent and that said Letters Patent is hereby corrected as shown below:

On the Title Page

Item (73) from Line 3 to Line 5, the second assignee's name reading:
-RESEARCH INSTITUTE OF PETROLEUM PROCESSING. SINOPEC- Should be changed to:
-RESEARCH INSTITUTE OF PETROLEUM PROCESSING, SINOPEC-.

Signed and Sealed this
First Day of November, 2022

Katherine Kelly Vidal
*Director of the United States Patent and Trademark Office*